US012725457B2

(12) United States Patent
Jiao et al.

(10) Patent No.: US 12,725,457 B2
(45) Date of Patent: Sep. 1, 2026

(54) IMAGE ACQUISITION METHOD AND APPARATUS, COMPUTER DEVICE, AND STORAGE MEDIUM

(71) Applicant: Tencent Technology (Shenzhen) Company Limited, Shenzhen (CN)

(72) Inventors: Lulu Jiao, Shenzhen (CN); Wen Ge, Shenzhen (CN); Jun Wang, Shenzhen (CN); Jiayu Huang, Shenzhen (CN); Guitao Zheng, Shenzhen (CN); Runzeng Guo, Shenzhen (CN); Ruixin Zhang, Shenzhen (CN); Yingyi Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 293 days.

(21) Appl. No.: 18/431,821

(22) Filed: Feb. 2, 2024

(65) Prior Publication Data

US 2024/0177527 A1 May 30, 2024

Related U.S. Application Data

(63) Continuation of application No. PCT/CN2023/097793, filed on Jun. 1, 2023.

(30) Foreign Application Priority Data

Jul. 27, 2022 (CN) ......................... 202210890681.8

(51) Int. Cl.
*G06V 40/60* (2022.01)
*G06T 7/20* (2017.01)
(Continued)

(52) U.S. Cl.
CPC ................ *G06V 40/67* (2022.01); *G06T 7/20* (2013.01); *G06T 7/70* (2017.01); *G06V 10/95* (2022.01);
(Continued)

(58) Field of Classification Search
CPC ........... G06F 21/32; G06F 3/01; G06Q 20/40; G06T 2207/30196; G06T 7/20;
(Continued)

(56) References Cited

U.S. PATENT DOCUMENTS

2009/0245585 A1 10/2009 Manabe et al.
2013/0308834 A1* 11/2013 Suzuki .............. G06V 40/1347 382/115
(Continued)

FOREIGN PATENT DOCUMENTS

CN 1726866 A 2/2006
CN 106056080 A 10/2016
(Continued)

OTHER PUBLICATIONS

Tencent Technology, Extended European Search Report, EP Patent Application No. 23845070.4, Jan. 7, 2025, 9 pgs.
(Continued)

*Primary Examiner* — Ming Wu
(74) *Attorney, Agent, or Firm* — Morgan, Lewis & Bockius LLP

(57) ABSTRACT

This application relates to an image acquisition method performed by a computer device. The method includes: displaying a mapping pattern corresponding to a key area of a target part of a target object in response to a pattern display operation triggered by the target object; changing a display state of the currently displayed mapping pattern when a relative position of the target part relative to an image acquisition element changes; and acquiring a key area image
(Continued)

of the target part contactlessly by using the image acquisition element when the currently displayed mapping pattern matches a preset recognition pattern.

20 Claims, 14 Drawing Sheets

(51) Int. Cl.

| | |
|---|---|
| ***G06T 7/70*** | (2017.01) |
| ***G06V 10/94*** | (2022.01) |
| ***G06V 40/12*** | (2022.01) |
| ***G06V 40/13*** | (2022.01) |

(52) U.S. Cl.
CPC ...... *G06V 40/1312* (2022.01); *G06V 40/1365* (2022.01); *G06V 40/1394* (2022.01); *G06T 2207/30196* (2013.01)

(58) Field of Classification Search
CPC ...... G06T 7/70; G06V 10/95; G06V 40/1312; G06V 40/1365; G06V 40/1394; G06V 40/40; G06V 40/45; G06V 40/67
See application file for complete search history.

(56) References Cited

U.S. PATENT DOCUMENTS

| | | | | |
|---|---|---|---|---|
| 2018/0164589 | A1* | 6/2018 | Watanabe | G02B 27/0101 |
| 2020/0380724 | A1* | 12/2020 | Ke | G06T 7/75 |
| 2020/0408519 | A1* | 12/2020 | Menier | G01C 11/06 |
| 2022/0091723 | A1 | 3/2022 | Faulkner et al. | |
| 2022/0128493 | A1* | 4/2022 | Miller | G01N 23/20058 |

FOREIGN PATENT DOCUMENTS

| | | | |
|---|---|---|---|
| CN | 106227334 | A | 12/2016 |
| CN | 106295288 | A | 1/2017 |
| CN | 106484098 | A | 3/2017 |
| CN | 107341473 | A | 11/2017 |
| CN | 112068698 | A | 12/2020 |
| CN | 112132099 | A | 12/2020 |
| CN | 112668539 | A | 4/2021 |
| CN | 112947755 | A | 6/2021 |
| CN | 113111723 | A | 7/2021 |
| CN | 114332964 | A | 4/2022 |
| CN | 114598817 | A | 6/2022 |
| WO | WO 2021062161 | A1 | 4/2021 |
| WO | WO 2021254310 | A1 | 12/2021 |

OTHER PUBLICATIONS

Tencent Technology, ISR, PCT/CN2023/097793, Sep. 20, 2023, 2 pgs.

* cited by examiner

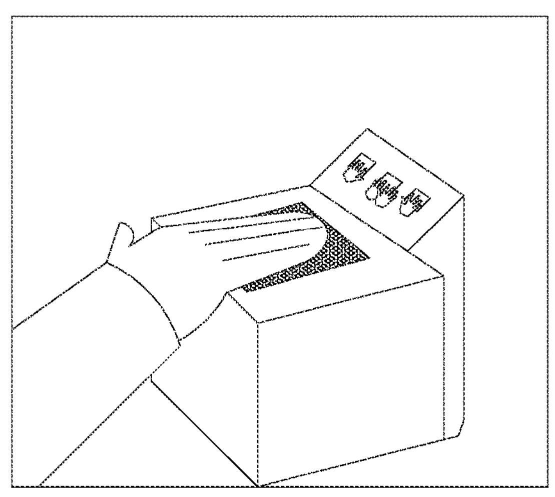
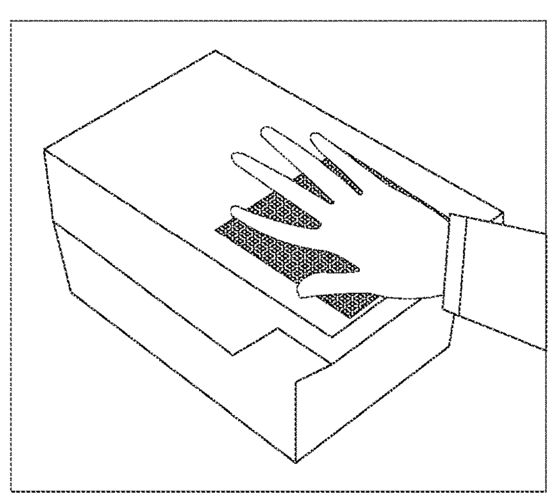
FIG. 1
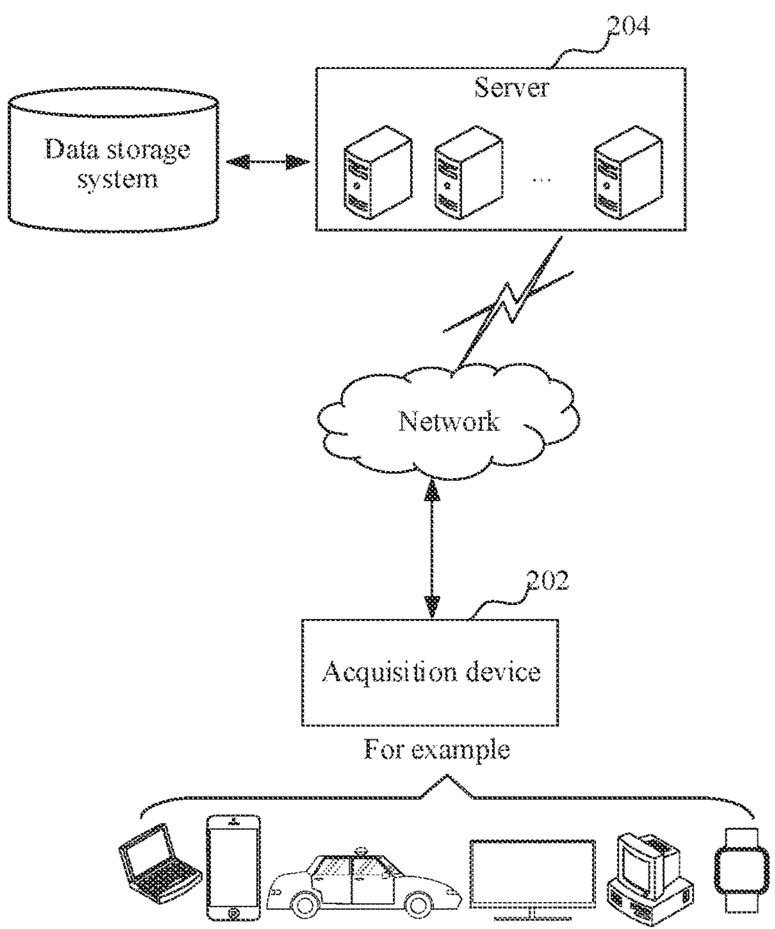
FIG. 2

S302

Display, by controlling a display element, a mapping pattern corresponding to a key area of a target part, in response to a pattern display operation triggered by the target part of a target object, a display state of the mapping pattern being related to a relative position of the target part relative to an image acquisition element

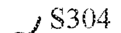

S304

Enable the display state of the currently displayed mapping pattern to change as a relative position changes, in a case that the relative position changes, the display state including at least one of a display position or a display size

S306

Acquire a key area image of the target part by using the image acquisition element in a case the currently displayed mapping pattern matches a preset recognition pattern;
the key area image being used for performing identity authentication on the target object

FIG. 3

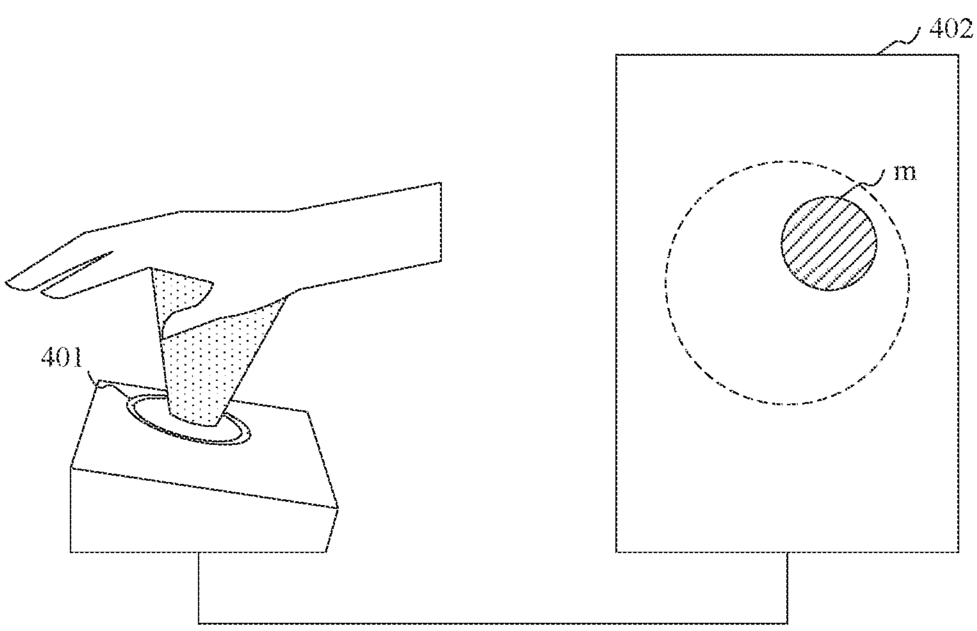

FIG. 4A

Animation demonstration
A device does not move, and a palm moves upward to guide a user away from a scanning area
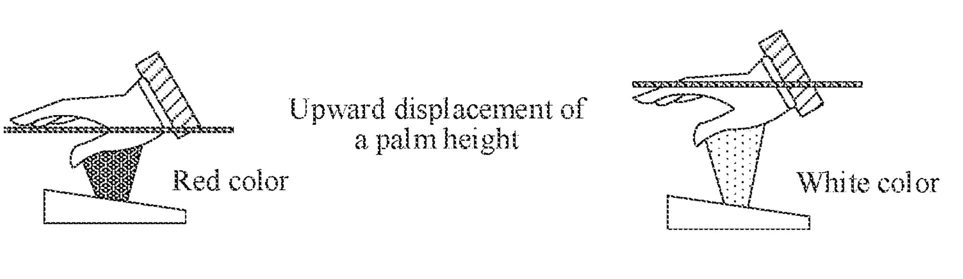
(a)
Animation demonstration
A device does not move, and a palm moves downward to guide a user away from a scanning area
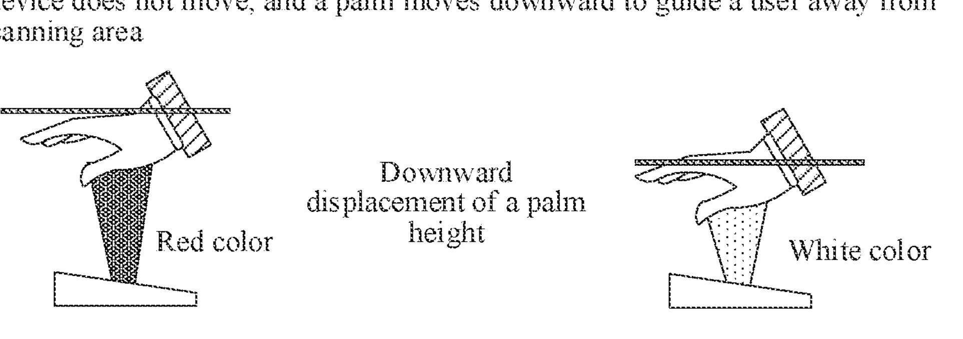
(b)
FIG. 11D

IMAGE ACQUISITION METHOD AND APPARATUS, COMPUTER DEVICE, AND STORAGE MEDIUM

CROSS-REFERENCE TO RELATED APPLICATIONS

This application is a continuation application of PCT Patent Application No. PCT/CN2023/097793, entitled "IMAGE ACQUISITION METHOD AND APPARATUS, COMPUTER DEVICE, AND STORAGE MEDIUM" filed on Jun. 1, 2023, which claims priority to Chinese Patent Application No. 2022108906818, entitled "BIOMETRIC AUTHENTICATION METHOD AND APPARATUS, COMPUTER DEVICE, AND STORAGE MEDIUM" filed with the China National Intellectual Property Administration on Jul. 27, 2022, all of which is incorporated herein by reference in its entirety.

This application relates to U.S. patent application Ser. No. 18/626,151, entitled "GUIDING METHOD AND APPARATUS FOR PALM VERIFICATION, TERMINAL, STORAGE MEDIUM, AND PROGRAM PRODUCT" filed on Apr. 3, 2024, which is incorporated herein by reference in its entirety.

This application relates to U.S. patent application Ser. No. 18/626,162, entitled "PALM IMAGE RECOGNITION METHOD AND APPARATUS, DEVICE, STORAGE MEDIUM, AND PROGRAM PRODUCT" filed on Apr. 3, 2024, which is incorporated herein by reference in its entirety.

FIELD OF THE TECHNOLOGY

This application relates to the field of image processing technologies, and in particular, to an image acquisition method and apparatus, a computer device, storage medium, and a computer program product.

BACKGROUND OF THE DISCLOSURE

With development of an image recognition technology, a method of using an image for identity authentication is widely used in various fields. The identity authentication includes face recognition authentication, palm print recognition authentication, iris recognition authentication, and the like.

In an identity authentication process, a user needs to continuously adjust a position of a to-be-acquired part, to enable the to-be-acquired part in a proper position. The palm print recognition is used as an example. A premise of the palm print recognition is to acquire a palm print. Currently, a commonly used method of acquiring a palm print is contact acquisition. In a palm print contact acquisition method, the user needs to place a hand on an acquisition device and adjust a position of the hand, so that the hand is in an acquisition area specified by the acquisition device, to enable the acquisition device to photograph an image of a palm.

However, the user needs to continuously move the palm to place the palm in the acquisition area specified by the acquisition device. After repeatedly placing and trial and error for many times, the user can only successfully acquire the palm print, resulting in low acquisition efficiency.

SUMMARY

Based on that, for the foregoing technical problem, it is necessary to provide an image acquisition method and apparatus that can improve palm print acquisition efficiency, a computer device, a computer-readable storage medium, and a computer program product.

According to various embodiments of this application, this application provides an image acquisition method performed by a computer device. The method includes:

- displaying a mapping pattern corresponding to a key area of a target part of a target object in response to a pattern display operation triggered by the target object;
- changing a display state of the currently displayed mapping pattern when a relative position of the target part relative to an image acquisition element changes; and
- acquiring a key area image of the target part contactlessly by using the image acquisition element when the currently displayed mapping pattern matches a preset recognition pattern.

According to various embodiments of this application, this application further provides a computer device. The computer device includes a memory and a processor. The memory has a computer program stored therein that, when executed by the processor, causes the computer device to perform the operations of the foregoing image acquisition method are implemented.

According to various embodiments of this application, this application further provides a non-transitory computer-readable storage medium. The computer-readable storage medium has a computer program stored thereon that, when executed by a processor of a computer device, causes the computer device to perform the operations of the foregoing image acquisition method are implemented.

BRIEF DESCRIPTION OF THE DRAWINGS

FIG. 1 is a schematic diagram of a scenario of contact acquisition according to some embodiments.

FIG. 2 is a diagram of an application environment of an image acquisition method according to some embodiments.

FIG. 3 is a schematic flowchart of an image acquisition method according to some embodiments.

FIG. 4A is a schematic diagram of a mapping pattern according to some embodiments.

FIG. 11D is a schematic diagram of an animation demonstration according to some embodiments.

Figures 4B, 5:
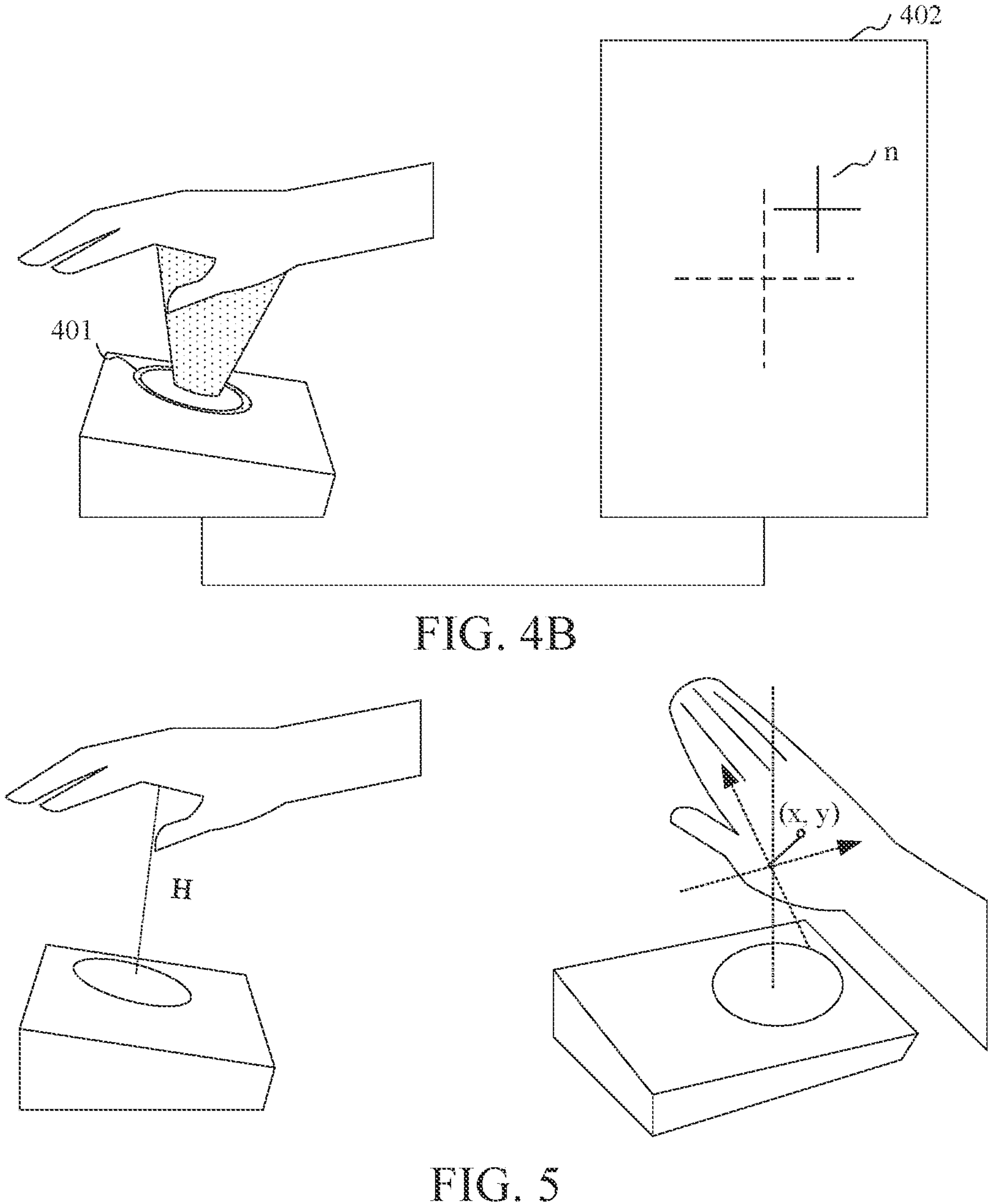
FIG. 4B is a schematic diagram of a mapping pattern according to some other embodiments.
FIG. 5 is a schematic diagram of a spatial height and a plane position of a target part according to some embodiments.

To better describe and illustrate embodiments and/or examples of those disclosures disclosed herein, reference may be made to one or more accompanying drawings. Additional details or examples used for describing the accompanying drawings are not to be construed a limitation on the scope of any one of the disclosed disclosures, the embodiments and/or examples currently described, and a best mode of these disclosures currently understood.

DESCRIPTION OF EMBODIMENTS

To make the objectives, technical solutions, and advantages of this application clearer, the following further describes this application in detail with reference to the accompanying drawings and the embodiments. It is to be understood that the specific embodiments described herein are merely used for explaining this application but are not intended to limit this application.

A current method of palm scanning acquisition or palm scanning payment is shown in FIG. 1. A user needs to continuously try and adjust a placement position of a hand, resulting in low acquisition efficiency. In addition, a contact palm scanning acquisition method needs a specialized acquisition device. For example, a palm vein sensor needs to be disposed in the acquisition device, so as to sense veins under skins of a palm to implement identity authentication. This method has a specific requirement on hardware performance.

In view of this, embodiments of this application provide an image acquisition method that abandons the contact palm scanning acquisition method and uses a non-contact palm scanning acquisition method to acquire a palm print, so that a necessary requirement for hardware infrastructure is lowered. In the non-contact palm scanning acquisition method, an image of a palm print is acquired, and the recognized palm part is mapped into a mapping pattern for display. As a relative position between a palm and an acquisition device changes, the displayed mapping pattern also provides corresponding feedback, thereby greatly improving a completion rate of acquisition and payment, improving user convenience, and facilitating quick acquisition and payment for the user. A single device is more convenient and efficient when being used by a plurality of people queue up.

An image acquisition method provided in the embodiments of this application may be applied to an application environment shown in FIG. 2. An acquisition device 202 communicates with a server 204 via a network. A data storage system may store data that the server 204 needs to process. The data storage system may be integrated on the server 204, or placed on a cloud or another server.

In some embodiments, a target object triggers a pattern display operation by placing a target part within a visual range of an image acquisition element. An acquisition device controls a display element to display a mapping pattern corresponding to a key area of the target part. When the target object changes a relative position of the target part of the target object relative to the image acquisition element, based on a change of the relative position of the target part relative to the image acquisition element, a display state of the mapping pattern displayed by the display element that is controlled by the acquisition device also changes as the relative position changes. The target object may adjust the relative position of the target part of the target object relative to the image acquisition element based on the display state of the displayed mapping pattern, so that the displayed mapping pattern matches a preset recognition pattern. In addition, when the displayed mapping pattern matches the preset recognition pattern, a key area image of the target part is acquired by using the image acquisition element, and is used for performing subsequent identity authentication on the target object.

The acquisition device 202 is configured to acquire the key area image of the target part of the target object. The acquisition device 202 includes at least an image acquisition element. The image acquisition element is configured to capture an object within a visual range. The visual range of the image acquisition element is determined based on a field of view. In some embodiments, for example, the image acquisition element is a camera, a video camera, a camera module integrated with an optical system or a CCD chip, a camera module integrated with an optical system and a CMOS chip, or the like. The image acquisition element may be integrated into the acquisition device 202 or may be disposed independently of the acquisition device 202. For example, the image acquisition element may be externally connected to the acquisition device 202, and communicates with the acquisition device 202 in a wired or wireless manner.

In some embodiments, the acquisition device 202 may further include the display element. The display element is configured to provide an interface for the target object to view the mapping pattern. In some embodiments, for example, the display element is a liquid crystal display, a projector, or the like. The display element may be integrated into the acquisition device 202 or may be disposed independently of the acquisition device 202. For example, the display element may be externally connected to the acquisition device 202, and communicates with the acquisition device 202 in a wired or wireless manner.

In a specific example, the acquisition device 202 may alternatively be, but is not limited to, a desktop computer, a notebook computer, a smartphone, a tablet, an Internet of Things device, or a portable wearable device. The Internet of Things device may be a smart speaker, a smart television, a smart air conditioner, a smart vehicle-mounted device, or the like. The portable wearable device may be a smartwatch, a smart band, a head-mounted device, or the like. In some embodiments, the acquisition device 202 may alternatively be an electronic device having a payment function.

The server 204 may be an independent physical server, may be a server cluster formed by a plurality of physical servers or a distributed system, or may be a cloud server that provides basic cloud computing services such as a cloud service, a cloud database, cloud computing, a cloud function, cloud storage, a network service, cloud communication, a middleware service, a domain name service, a security service, a content delivery network (CDN), or big data and an artificial intelligence platform.

In some embodiments, the acquisition device 202 may be loaded with an application (APP) or an application having a mapping pattern display function, including a conventional application that needs to be installed separately and an applet application that may be used without downloading and installing. The application may be an application having one or more of a social function, an instant messaging function, a payment function, or the like.

In some embodiments, as shown in FIG. 3, an image acquisition method is provided. The method may be performed by an acquisition device independently, or be performed by an acquisition device in cooperation with a server. The following using an example in which the method is applied to the acquisition device in FIG. 2 for description, the method includes the following steps.

Step S302: Display a mapping pattern corresponding to a key area of a target part, in response to a pattern display operation triggered by the target part of a target object, a display state of the mapping pattern being related to a relative position of the target part relative to an image acquisition element.

The target object is a specified type of object. For example, the target object may be specified as a human, an animal, a robot, or the like. The target part is a pre-specified part on the target object, including but not limited to one or more of a face, a palm, a finger, or the like of the target object.

The key area is a part area of the target part. The key area includes biological information used for performing identity authentication on the target object. The biological information included in the key area can distinguish different target objects. An example in which the target object is a human and the target part is a palm is used. A palm print image in a center of the palm needs to be acquired and another part of the palm does not need to be acquired. Therefore, a palm area is the key area and another area is a non-key area. Similarly, for another target part, during acquiring, the key area is focused, and the non-key area does not need to be acquired. Alternatively, an example in which the target object is a human and the target part is a finger is used. A fingerprint image of a fingertip needs to be acquired, and another part of the finger does not need to be acquired. Therefore, a fingertip area is the key area and another arca is a non-key arca.

To avoid interference of the non-key area on an acquisition process, and improve accuracy and efficiency of acquiring a key area image, in the embodiment of this application, the key area of the target part is visualized in a form of a mapping pattern, and the relative position of the target part relative to the image acquisition element is fed back based on the display state of the mapping pattern. Therefore, there is no need to focus on a state of the non-key area of the target part (such as a position, a posture, existence, or absence of an obstacle), the interference of the non-key area of the target part on an acquisition key area can be eliminated, and acquisition accuracy is high.

The pattern display operation refers to an operation used for triggering the display element of the acquisition device to display the mapping pattern. In some embodiments, when the target part is within a visual range of the image acquisition element, it may be considered that the target part of the target object triggers the pattern display operation. Alternatively, when duration that the target part stays within the visual range of the image acquisition element exceeds a specific threshold, it may be considered that the target part of the target object triggers the pattern display operation.

For example, the image acquisition element may be in a working or sleep state. After the image acquisition element wakes up to start acquiring an image, the image acquisition element may detect images of various objects. Until the image acquisition element detects the target part of the target object, it is determined that the target part triggers the pattern display operation. In other words, although the image acquisition element detects an image of another object, the pattern display operation is not triggered, ensuring that only the target object triggers the pattern display operation by using the target part, and improving security of the acquisition process.

In some embodiments, to avoid false triggering caused by an action of the target object, after the image acquisition element detects the target part, and when the duration that the target part stays within the visual range of the image acquisition element is not less than preset duration, it is determined that the target part triggers the pattern display operation. In other words, when the image acquisition element continuously detects an image of the target part in the preset duration, it is determined that the target part triggers the pattern display operation. In this way, a phenomenon of false triggering caused by the target part temporarily staying within the visual range is avoided, and that the target object has an intention for identity authentication is ensured.

The mapping pattern is a visualized display of the key area of the target part in an interface displayed by the display element. The mapping pattern may be displayed as a two-dimensional plane pattern, a three-dimensional pattern, and the like. The mapping pattern may be a complex pattern, a simple geometric shape, or a combination of geometric shapes. The mapping pattern may be a closed shape, a semi-closed shape, an unclosed shape, or the like. For example, the mapping pattern may be a circle, an ellipse, a polygon, a cross shape, another irregular geometric shape, or the like.

The display state of the mapping pattern includes, but is not limited to, one or more of a display position of the mapping pattern presented in the interface, a display size presented in the interface, transparency of the mapping pattern, a color of the mapping pattern, a flash frequency of the mapping pattern, or the like. The display state of the mapping pattern is used for reflecting a relative position of the target part relative to the image acquisition element. For example, a greater distance of the target part relative to the image acquisition element indicates a smaller display size of the mapping pattern presented in the interface. For another example, when the target part is offset relative to the image acquisition element in a horizontal direction, the display position of the mapping pattern presented in the interface is also offset relative to an initial position. For still another example, a greater distance of the target part relative to the image acquisition element indicates higher transparency of the mapping pattern. For still another example, when a distance of the target part relative to the image acquisition element changes, the color of the mapping pattern also changes with the distance. For still another example, when the distance of the target part relative to the image acquisition element is close, the mapping pattern flashes at a lower frequency. When the distance of the target part relative to the image acquisition element is far, the mapping pattern flashes at a higher frequency.

For example, the key area of the target part may be mapped into a two-dimensional circular mapping pattern, as shown in FIG. 4A. In a display interface displayed by a display element 402, a two-dimensional circle m filled with solid lines is used as a visualized display of a target part. Differences of a display position and a display size of the two-dimensional circle m directly reflect a relative position of the target part relative to an image acquisition element 401.

For another example, the key area of the target part may be mapped into a mapping pattern formed by geometric line segments, as shown in FIG. 4B. In the display interface displayed by the display element 402, a cross solid line segment n is used as a visualized display of the target part. Differences of a display position and a display size of the cross solid line segment n directly reflect the relative position of the target part relative to the image acquisition element 401.

The relative position refers to a spatial positional relationship of the target part relative to the image acquisition element, including, but not limited to, a spatial height of the target part relative to the image acquisition element and a plane position of the target part on a plane parallel to the image acquisition element. As shown in FIG. 5, a relative position of a target part relative to an image acquisition element includes a spatial height H of the target part relative to the image acquisition element, and a plane position (x, y) of the target part on a plane parallel to the image acquisition element.

The spatial height of the target part relative to the image acquisition element is usually a distance between a center of the target part and a plane at which the image acquisition element is located. For example, the plane at which the image acquisition element is located is a plane at which an optical lens in a camera is located. A horizontal position of the target part relative to the image acquisition element refers to a distance on the plane between the projection center where the target part is mapped on the plane at which the image acquisition element is located and the center of the image acquisition element on the plane at which the image acquisition element is located. For example, the center of the image acquisition element on the plane of the image acquisition element is a center of the camera.

Specifically, a target object triggers a pattern display operation. An acquisition device responds to the pattern display operation. A display element displays a mapping pattern that is preset and used for symbolizing the key area of the target part. Different key areas may be preset with different mapping patterns. For example, a palm is symbolized by a circle, and a finger is symbolized by an oval.

Step S304: Enable the display state of the currently displayed mapping pattern to change as the relative position changes, when the relative position of the target part relative to the image acquisition element changes, the display state including at least one of a display position or a display size.

To provide an intuitive and real-time feedback on a current state of the target part, the display state of the mapping pattern is to change as a state of the target part changes, thereby giving the target object an intuitive and clear awareness, that is, a clear awareness of the relative position of the target part of the target object relative to the image acquisition element. Therefore, the target object can be quickly and directly guided to adjust the state of the target part, thereby facilitating quick acquisition of a proper key area image by the image acquisition element. Therefore, in some embodiments, the enabling the display state of the currently displayed mapping pattern to change as the relative position changes, when the relative position of the target part relative to the image acquisition element changes includes: enabling the display state of the currently displayed mapping pattern to change in real time as the relative position changes, when the relative position of the target part relative to the image acquisition element changes.

Specifically, when the target object controls the target part to move, the relative position of the target part relative to the image acquisition element changes. Correspondingly, a display position of the mapping pattern also changes, a display size of the mapping pattern also changes, both the display position and the display size of the mapping pattern change, or the like. For example, that the display position of the mapping pattern changes is that the display position of the mapping pattern is offset compared with an initial position. When the target part of the target object triggers a pattern display operation, a position of the mapping pattern subsequently displayed by the acquisition device is the initial position of the mapping pattern.

In some embodiments, when the target part is away from the image acquisition element, to reflect this state, a greater distance indicates a smaller display size of the mapping pattern displayed by the display element. For another example, the mapping pattern is increasingly offset from a preset position in an interface (such as a central position of the interface).

In some embodiments, the display state of the mapping pattern displayed by the display element further includes, but is not limited to, one or more of a blurring degree, a color, or movement speed.

For example, as the relative position of the target part relative to the image acquisition element changes, the blurring degree (that is, transparency) of the mapping pattern displayed by the display element also changes as the relative position changes.

For another example, as the relative position of the target part relative to the image acquisition element changes, the color or a shade of the color of the mapping pattern displayed by the display element changes.

For still another example, as the relative position of the target part relative to the image acquisition element changes, the movement speed of the mapping pattern displayed by the display element also changes, which may be a process of going from slow to fast, from fast to slow, from static to moving, from moving to static, or the like.

In an actual application scenario, even if the target object controls the target part to maintain a posture, the target part is also prone to slight movement, such as slight displacement in a height direction or a plane direction. Therefore, to avoid a problem of inconvenient manipulation caused by oversensitivity, in some embodiments, there is an allowable range for a change amount of the relative position of the target part relative to the image acquisition element. When the change amount of the relative position is within the allowable range, it may be considered that the relative position of the target part relative to the image acquisition element does not change. Correspondingly, the display state of the mapping pattern displayed by the display element does not change.

For another example, in another embodiment, when the change amount of the relative position is within the allowable range, although the relative position of the target part relative to the image acquisition element changes, the display state of the mapping pattern displayed by the display element does not change.

Step S306: acquire a key area image of the target part contactlessly by using the image acquisition element when the currently displayed mapping pattern matches a preset recognition pattern; the key area image being used for performing identity authentication on the target object.

Contactless acquisition refers to non-contact image acquisition. The non-contact image acquisition refers to that the target part of the target object is not in contact with the image acquisition element. An objective of the contactless acquisition is to acquire a part image of the target part of the target object. In other words, the contactless acquisition refers to that the image acquisition element performs image acquisition on the target part when the image acquisition element is not contact with the target part of the target object.

In a contactless acquisition scenario, the relative position of the target part relative to the image acquisition element is uncontrollable and may change at any time, and an acquisition process needs the target part to be in a correct position, or to remain in a correct position for specific duration. For example, the target part needs to be at a proper spatial height from the image acquisition element. An excessively high or excessively low spatial height causes a blurry or an incomplete acquired key area image. For another example, the target part needs to be within the acquisition range of the image acquisition element. A far offset causes an incomplete or a distorted acquired key area image, finally resulting in an inaccurate identity authentication result. The acquisition range is within a visual range of the image acquisition element.

Therefore, to guide the target object to adjust the relative position of the target part of the target object relative to the image acquisition element, a direct and clear feedback can be provided to the target object. In addition to displaying the mapping pattern, the display element further displays a preset recognition pattern. The preset recognition pattern is a pattern fixed in an interface, and is used for representing a display state of the mapping pattern when the target part of the target object is in a correct spatial position. In other words, the preset recognition pattern is one of display states of the mapping pattern. The preset recognition pattern may be used as a standard state of the mapping pattern, and is used for visually showing a difference between a current state and the standard state of the mapping pattern. Therefore, when the relative position of the target part relative to the image acquisition element changes, the display state of the mapping pattern also changes. By feeding back a difference between the mapping pattern and the preset recognition pattern to the target object, the target object may perform an adaptive adjustment, to enable the mapping pattern to match the preset recognition pattern.

Conditions for matching the mapping pattern with the preset recognition pattern include, but are not limited to, one or more of a size of the mapping pattern, a position of the mapping pattern, a coincidence rate with the preset recognition pattern, or the like. For example, when the size of the mapping pattern is consistent with a size of the preset recognition pattern or a difference between the size of the mapping pattern and the size of the preset recognition pattern is less than a threshold, it is determined that the mapping pattern matches the preset recognition pattern. For another example, when the position of the mapping pattern coincides with a position of the preset recognition pattern or a difference between the position of the mapping pattern and the position of the preset recognition pattern is less than a threshold, it is determined that the mapping pattern matches the preset recognition pattern. For still another example, when the mapping pattern coincides with the preset recognition pattern and the coincidence rate is greater than a threshold, it is determined that the mapping pattern matches the preset recognition pattern.

Figure 6A:
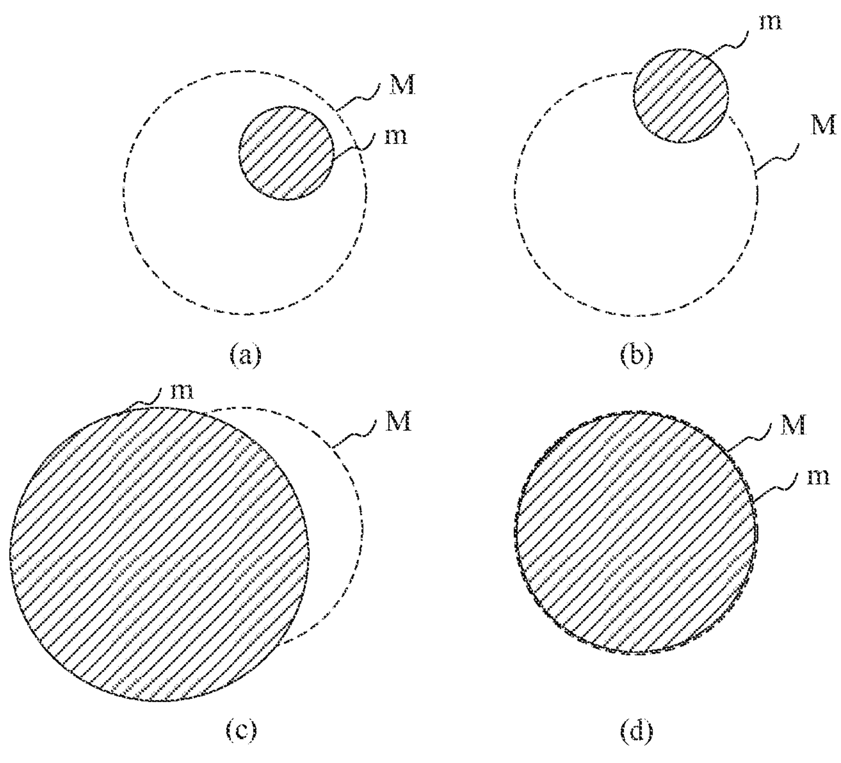
FIG. 6A is a schematic diagram of a mapping pattern and a preset recognition pattern according to some embodiments.

For example, assuming that a mapping pattern m is a two-dimensional circle, as shown in FIG. 6A, a preset recognition pattern M may be a circle with a fixed size and a fixed position. When a spatial height of a target part relative to an image acquisition element is excessively high, it is displayed that the mapping pattern m is smaller than the preset recognition pattern M, as shown in section (a) and section (b) in FIG. 6A. In contrast, when the spatial height of the target part relative to the image acquisition element is excessively low, it is displayed that the mapping pattern m is larger than the preset recognition pattern M, as shown in section (c) in FIG. 6A. In addition, when a plane position of the target part relative to the image acquisition element changes, it is displayed that an orientation of the displayed mapping pattern m relative to the preset recognition pattern M also changes, as shown in section (a), section (b), and section (c) in FIG. 6A. When the mapping pattern m matches the preset recognition pattern M in size and position, that is, a display state shown in section (d) in FIG. 6A, it may be determined that the mapping pattern matches the preset recognition pattern. In some embodiments, when the mapping pattern matches the preset recognition pattern, a display color of the mapping pattern may also change, to provide the target object a clear and obvious feedback.

Figure 6B:
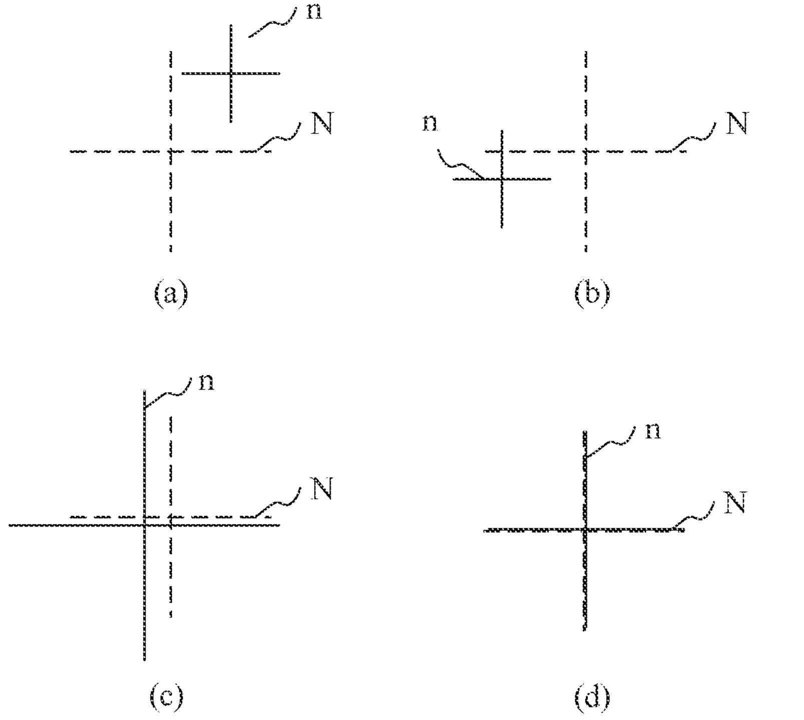
FIG. 6B is a schematic diagram of a mapping pattern and a preset recognition pattern according to some other embodiments.

For another example, assuming that a mapping pattern n is a cross shape, as shown in FIG. 6B, a preset recognition pattern N may be a cross shape with a fixed size and a fixed position. When a spatial height of a target part relative to an image acquisition element changes, a display position and a display size of the mapping pattern n also changes, as shown in section (a), section (b), and section (c) in FIG. 6B. When the mapping pattern n matches the preset recognition pattern N in size and position, that is, a display state shown in section (d) in FIG. 6B, it may be determined that the mapping pattern matches the preset recognition pattern.

Figure 6C:
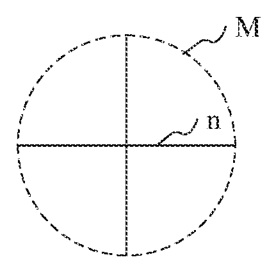
FIG. 6C is a schematic diagram of a mapping pattern and a preset recognition pattern according to some still other embodiments.

Certainly, the mapping pattern and the preset recognition pattern are not necessarily a same pattern. As shown in FIG. 6C, the display state of the mapping pattern n reflects a relative position of the target part relative to the image acquisition element, to prompt a target object to adjust a spatial position of the target part, so that the mapping pattern n matches the preset recognition pattern M. For example, the preset recognition pattern M is an externally tangent circle of the mapping pattern.

When the mapping pattern matches the preset recognition pattern, the acquisition device acquires a key area image of the target part by using the image acquisition element. Therefore, after acquiring the key area image of the target part, identity authentication may be performed on the target object. The identity authentication refers to using biological information of the target object to verify an identity of the target object. In the embodiment of this application, the biological information refers to information of the key area of the target part. An example in which the target part is a palm is used. Information of a key area includes, but is not limited to, one or more of a palm print, a palm shape, a vein, or the like.

In some embodiments, when the mapping pattern matches the preset recognition pattern, the acquisition device acquires a multi-frame key area image of the target part by using the image acquisition element, to improve authentication accuracy.

In some embodiments, the acquisition device sends one or more frames of key area images to a server, to enable the server performs identity authentication based on the one or more frames of key area images. The server may use a palm print recognition model and the like to recognize the key area image, extract one or more biological information such as a palm print, a palm shape, or a vein in the image, and perform recognition based on the one or more biological information to determine whether the target object is a pre-registered object. When the target object is the pre-registered object, it is determined that identity authentication of the target object passes. Certainly, when it is supported by a hardware condition of the acquisition device, the acquisition device itself may also process the key area image for the identity authentication.

In some embodiments, the acquisition device further receives an authentication result returned by the server, and displays the authentication result in a display interface by using a display element. For example, when the identity authentication of the target object passes, the acquisition device receives the authentication result returned by the server, and displays the authentication result in the display interface by using the display element, such as "Congratulations on passing the authentication", "Successful authentication", or another prompt, to feed back the authentication result to the target object.

In the foregoing image acquisition method, the identity authentication is performed by contactless acquiring, so that a necessary requirement for hardware infrastructure is lowered. In response to a pattern display operation triggered by the target part of the target object, and visually displaying the key area of the target part as a mapping pattern in a visual manner, based on the variation of the relative position of the target part relative to the image acquisition element, a display state of the displayed mapping pattern also changes. By feeding back a difference between the mapping pattern and the preset recognition pattern to the target object, the target object is intuitively and clearly prompted to perform an adaptive adjustment, to enable the mapping pattern to match the preset recognition pattern. Therefore, acquisition efficiency is greatly improved, and user experience is improved. When the currently displayed mapping pattern matches the preset recognition pattern, then the key area image of the target part is acquired by using the image acquisition element for the identity authentication, so that accuracy of acquiring an image can be ensured, further improving accuracy of an identity authentication result, and also protecting resource security of the target object.

To ensure security of the identity authentication, and avoid forging an identity by using a photo to achieve an objective of the identity authentication, in some embodiments, before the displaying a mapping pattern corresponding to a key area of a target part in response to a pattern display operation triggered by the target part of a target object, the method further includes: performing object detection and liveness detection on a target within the acquisition range of the image acquisition element; and when it is detected that the target is the target part of the target object and liveness is detected, determining that the target part of the target object triggers the pattern display operation.

Specifically, the acquisition device performs the object detection on a target appearing within the acquisition range of the image acquisition element, to ensure that an object that triggers the pattern display operation is the target part of the target object instead of another object or another part of the target object. In addition, the acquisition device performs the liveness detection on the target appearing within the acquisition range of the image acquisition element, to determine that the currently detected target part has a vital sign instead of a photo, a statue, or the like.

For example, an infrared sensor is further disposed in the acquisition device. The target appearing within the acquisition range of the image acquisition element is detected by using the infrared sensor, and whether there is a vein feature is detected. The vein feature refers to an image feature belonging to a vein pattern in an image. When the vein feature is detected, the acquisition device determines that a currently monitored target passes the liveness detection. In contrast, when the vein feature is not detected, the acquisition device determines that a currently monitored target does not pass the liveness detection. Therefore, performing of the pattern display operation may be refused. Therefore, another object other than the target object may be prevented from using the target part of the target object without knowing of the target object, to impersonate the target object, further protecting privacy security and resource security of the target object.

In the foregoing embodiments, while secure identity authentication is performed, the privacy security and the resource security of the target object can be protected by performing the object detection and the liveness detection before it is determined that the pattern display operation is triggered.

In some embodiments, a display state of a mapping pattern is reflected by at least one of a display position of the mapping pattern and a display size of the mapping pattern. Correspondingly, the enabling the display state of the currently displayed mapping pattern to change as the relative position changes, when the relative position of the target part relative to the image acquisition element changes includes: enabling a display size of the currently displayed mapping pattern to change in an opposite direction as the spatial height changes, when the spatial height of the target part relative to the image acquisition element changes; and enabling a display position of the currently displayed mapping pattern to change in a same direction as a plane position of the key area of the target part changes within an acquisition range of the image acquisition element.

The plane position is a position of the target part in a plane parallel to the image acquisition element. When the target part is directly opposite to the image acquisition element, a plane position of the target part is a plane position in a plane directly opposite to the target part. When the target part has a specific inclination angle relative to the image acquisition element, the plane position of the target part is a position projected by the target part in a plane parallel to the image acquisition element.

In a process of performing the pattern display operation by the target object, the relative position of the target part relative to the image acquisition element may change. For example, the spatial height of the target part from the image acquisition element changes, or the plane position of the target part relative to the image acquisition element changes.

To provide intuitive feedback on a current state of the target part, the display state of the mapping pattern is to change as a state of the target part changes. In other words, when the spatial height of the target part relative to the image acquisition element changes, or when the plane position of the target part relative to the image acquisition element changes, the display state of the mapping pattern is also to change.

The display size of the mapping pattern may intuitively reflect a distance of the target part relative to the image acquisition element. In some embodiments, when the spatial height of the target part relative to the image acquisition element becomes greater, the display size of the currently displayed mapping pattern decreases as the spatial height increases. When the spatial height of the target part relative to the image acquisition element becomes smaller, the display size of the currently displayed mapping pattern is enabled to increase as the spatial height decreases. In other words, a greater distance of the target part relative to the image acquisition element indicates a smaller mapping pattern. A smaller distance of target part relative to the image acquisition element indicates a larger mapping pattern. In other words, a higher spatial height indicates a smaller displayed mapping pattern. In contrast, a lower spatial height indicates a larger displayed mapping pattern. In other words, the display size of the mapping pattern changes in an opposite direction as the spatial height changes. Therefore, a size transformation relationship that "something looks small in the distance and big on the contrary" is satisfied. A spatial position of the target part can be reflected more intuitively and quickly, facilitating a quick adjustment of the target object.

The display position of the mapping pattern may intuitively reflect a position offset of the target part relative to the image acquisition element. In other words, the target part is located in a specific orientation of the image acquisition element. When the target part is located to the left of the image acquisition element, the mapping pattern is also displayed to the left. When the target part is located to the right of the image acquisition element, the mapping pattern is also displayed to the right. The same applies to the upper and lower positions. In other words, the display position of the mapping pattern changes in a same direction as the plane position of the target part changes.

In the foregoing embodiments, by feeding back a difference between the mapping pattern and the preset recognition pattern to the target object, the target object is intuitively and clearly prompted to perform an adaptive adjustment, to enable the mapping pattern to match the preset recognition pattern. Therefore, acquisition efficiency is greatly improved, and user experience is improved.

Usually, when a spatial height of a target part relative to an image acquisition element in actual physical space is converted into a display size of a mapping pattern in a display interface, numeric conversion is needed to present a more beautiful interface. Therefore, in some embodiments, the enabling a display size of the currently displayed mapping pattern to change in an opposite direction as the spatial height changes, when the spatial height of the target part relative to the image acquisition element changes includes: determining a current spatial height of the target part of the target object relative to the image acquisition element; mapping the spatial height to a current display size based on a preset distance mapping relationship, a greater spatial height indicating a smaller mapped current display size; and adjusting the display size of the mapping pattern to the current display size to update and display.

Specifically, by obtaining the current spatial height of the target part of the target object relative to the image acquisition element, the acquisition device maps the spatial height to a current display size of the mapping pattern based on a preset distance mapping relationship.

For example, the distance mapping relationship may be represented by the following formula:

$$f = \begin{cases} 1.8 & P < 0.2\ L \\ 1 - \dfrac{P - L}{L} & P > 0.2\ L \text{ and } P < 1.8\ L \\ 0.2 & P > 1.8\ L \end{cases}.$$

P is the current spatial height of the target part relative to the image acquisition element. L is a preset standard height. f is a scaling ratio of a size of the mapping pattern. To be specific, when a distance is excessively close, the size is amplified, and when a distance is excessively far, the size is reduced. To avoid affecting experience due to an excessively large or excessively small mapping pattern, f is set to a fixed value in P<0.2 L or P>1.8 L, further ensuring that the display size of the mapping pattern is within a proper range.

Then, the acquisition device adjusts the display size of the mapping pattern to the current display size by using the display element to update and display, thereby providing real-time feedback on the current spatial height of the target part currently relative to the image acquisition element.

Therefore, the detected spatial height of the target part relative to the image acquisition element is mapped to a display size of the mapping pattern in a specific ratio, satisfying a well-known relationship that "something looks small in the distance and big on the contrary", so that the target object conveniently adjusts the target part to a proper distance, and efficiency is high.

In some embodiments, the acquisition device may obtain a spatial height of the target part relative to the image acquisition element via an acquired image. For example, the spatial height of the target part relative to the image acquisition element is calculated based on a mapping relationship between the size and the spatial height of the key area in the acquired target part. In another embodiment, a plurality of distance sensors are deployed around the image acquisition element. When the target part is placed within a visual range of the image acquisition element, the acquisition device may detect the spatial height of the target part relative to the image acquisition element by using the distance sensors.

Therefore, the determining a current spatial height of the target part of the target object relative to the image acquisition element includes: obtaining a plurality of effective distances corresponding to the key area of the target part by using the plurality of distance sensors when the target part is within the acquisition range of the image acquisition element; and determining the current spatial height of the target part relative to the image acquisition element based on the plurality of effective distances.

A quantity of distance sensors may be determined according to an actual requirement, and the distance sensors are symmetrically distributed. For example, the distance sensor is a sensor using a time of flight (ToF) technology. When the distance sensor does not detect an object, or a distance between the object and the distance sensor exceeds a detectable range, the distance sensor outputs a specific value. When the distance sensor detects an object within the detectable range of the distance sensor, the distance sensor outputs a distance value.

Usually, the target part blocks at least one distance sensor, and the acquisition device calculates a final distance based on respective distances detected and outputted by the at least one distance sensor. The final distance is a current spatial height of the target part relative to the image acquisition element.

Specifically, when the target part is within the acquisition range of the image acquisition element, the target part is within the detectable range of one or more distance sensors. In other words, one or more distance sensors are covered by a projection area of the key area of the target part projected to a plane at which the distance sensors is located. The acquisition device obtains a plurality of effective distances corresponding to the key area of the target part by using the one or more distance sensors. However, another distance sensor that does not detect the target part outputs an invalid distance value. Therefore, the acquisition device may determine the current spatial height of the target part relative to the image acquisition element based on the plurality of effective distances. For example, the acquisition device uses an average value of the plurality of effective distances as the current spatial height of the target part relative to the image acquisition element.

Figure 7A:
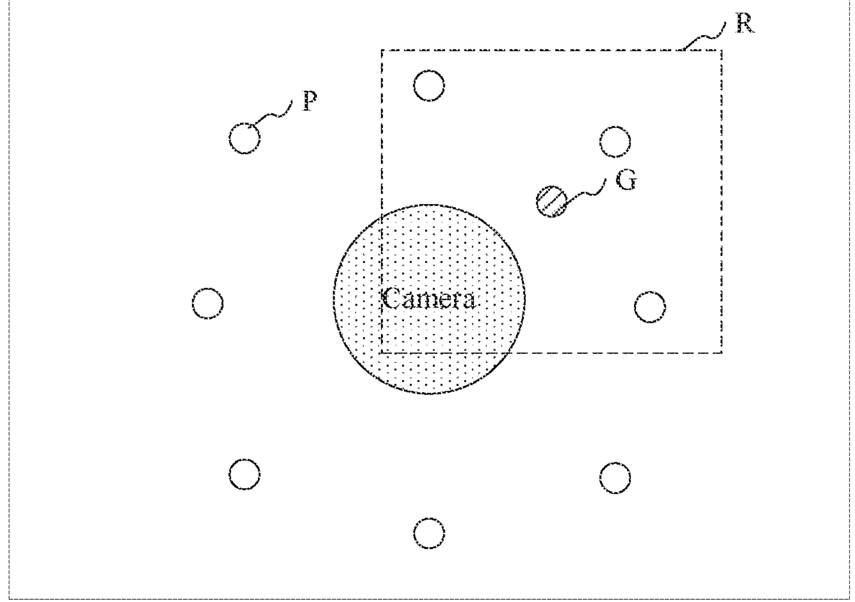
FIG. 7A is a schematic diagram of distance detection according to some embodiments.

For example, as shown in FIG. 7A, a plurality of distance sensors P are arranged around a camera of an image acquisition element. The acquisition device determines, based on a range covered by a key area R of a target part, distance sensors correspondingly disposed in the range, that is, the distance sensors blocked by the target part, and obtains a current spatial height of the target part relative to the image acquisition element based on distance values output by these distance sensors.

In an actual scenario, due to possible occlusion by arms and the like, the plurality of distance sensors each return a distance value, but only some of distance values are distance values corresponding to the target part, and remaining distance values may be distance values of the arms detected due to the possible occlusion of the arms and the like, resulting in an inaccurate result of distance detection.

Therefore, in some embodiments, disposed distance sensors are divided into quadrants, and there are a plurality of distance sensors in each quadrant. Therefore, the acquisition device determines a key area center G based on the key area of the target part detected by the image acquisition element, obtains a plurality of distance values outputted by the plurality of distance sensors in the quadrant based on a quadrant at which the key area center G is located, and determines a current spatial height of the target part relative to the image acquisition element based on the plurality of distance values.

Figure 7B:
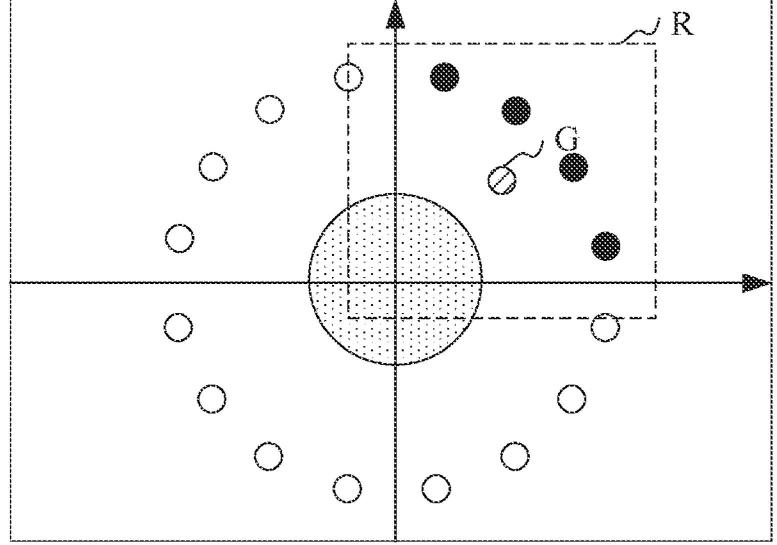
FIG. 7B is a schematic diagram of distance detection according to some other embodiments.

As shown in FIG. 7B, the acquisition device determines, based on the key area R of the target part detected by the image acquisition element, a quadrant at which the center G of the key area is located as a first quadrant, therefore, determines distance sensors in the first quadrant (shown as black circles in the figure, to distinguish the distance sensors from other sensors), and obtains distance values outputted by these sensors.

Therefore, a plurality of distance sensors are disposed around the camera for detection, so that the spatial height of the target part relative to the image acquisition element can be obtained more accurately, and the size of the presented mapping pattern can be accurate, to enable the target object to adjust the spatial height of the target part quickly and accurately.

In addition to the display size of the mapping pattern, the mapping pattern may also reflect an orientation of the target part relative to the image acquisition element via the display position of the mapping pattern. In some embodiments, the enabling a display position of the currently displayed mapping pattern to change in a same direction as a plane position of the key area of the target part changes within an acquisition range of the image acquisition element includes: obtaining the plane position of the key area of the target part within the acquisition range of the image acquisition element; determining offset information of the plane position relative to a preset position within the acquisition range; and determining a current display position of the mapping pattern based on the offset information, and adjusting the display position of the mapping pattern to the current display position to update and display.

Specifically, the acquisition device determines, based on an image of the target part detected by the image acquisition element, the key area of the target part by using an object detection algorithm or another method. For example, the acquisition device uses a You Only Look Once: Unified, Real-Time Object Detection (YOLO) algorithm to extract a feature from the image of the target part, thereby determining the key area in the image of the target part.

Figure 8A:
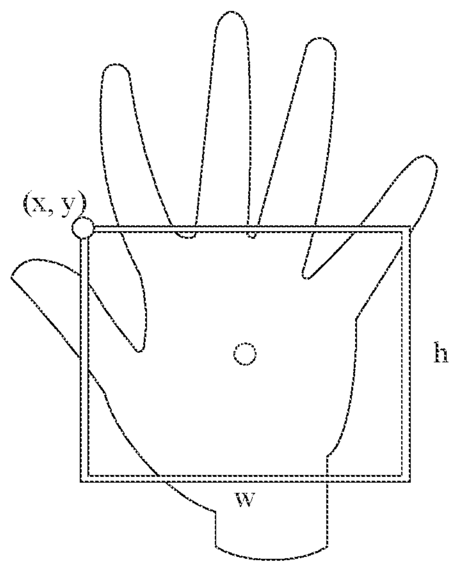
FIG. 8A is a schematic diagram of a key area according to some embodiments.

For example, the acquisition device divides the image of the target part into S×S grids, and then predicts a plurality of bounding boxes for each grid. Each bounding box includes a center coordinate (x, y), a width w, a height h, and a confidence. Because the embodiment of this application focuses on the key area of the target part, the confidence is used for outputting a probability that a detection object is the key area (for example, a palm) of the target part. For example, the bounding box with a highest confidence may be used as a range of the key area. Therefore, the key area of the target part may be determined. For example, as shown in FIG. 8A, (x, y) is a pixel position of the upper left corner of the key arca, w is a width of the key area, and h is a height of the key area. A position of a key area center may be determined based on a coordinate of the upper left corner of the key area as well as the width and height of the key area. The width w and the height h may be normalized, to be specific, divided by a width W and a height H of the image respectively, so that the width w and the height h of the bounding box are within a range [0, 1].

After determining the key area of the target part, the acquisition device may determine, based on the pixel position of the upper left corner of the key area, a current plane position at which the key area is located within the acquisition range. Then, the acquisition device may calculate the offset information of the plane position relative to a preset position within the acquisition range based on the plane position at which the key area is located.

For example, an offset is determined based on a difference value between a pixel position of the preset position (also represented in the form of the coordinate) and a pixel position corresponding to the plane position (that is, the pixel position of the upper left corner). The offset is a vector value, and an orientation of the target part relative to the image acquisition element may be determined based on symbol information of the offset.

Therefore, the acquisition device may determine the current display position of the mapping pattern based on the offset information, and adjust the display position of the mapping pattern to the current display position to update and display, thereby providing real-time feedback on a current orientation and position offset of the target part currently relative to the image acquisition element.

In the foregoing embodiments, that the plane position of the key area of the target part changes within the acquisition range of the image acquisition element is mapped to the display position of the mapping pattern. When the target part drives the key area to be offset in a specific direction, the mapping pattern is also offset in the direction. In this way, an intuitive and clear feedback on a current state of the target part can be provided. The real-time feedback is to prompt the target object to make an adjustment, and acquisition efficiency is high.

In some embodiments, the determining a current display position of the mapping pattern based on the offset information includes: performing normalization processing on the offset information based on the acquisition range, to obtain an offset ratio; and determining the current display position of the mapping pattern in a current display interface based on symbol information carried in the offset information and the offset ratio.

Specifically, the acquisition device determines a corresponding image range, that is, the width W and the height H of the image, based on the acquisition range of the image acquisition element. The normalization processing is performed on the calculated offset information based on an image range. In this way, the acquisition device can obtain the offset ratio of the key area within the image range. A current display position of the mapping pattern in a current display interface may be determined based on the symbol information carried in the offset information, that is, the vector information of the offset, with reference to the offset ratio.

Figure 8B:
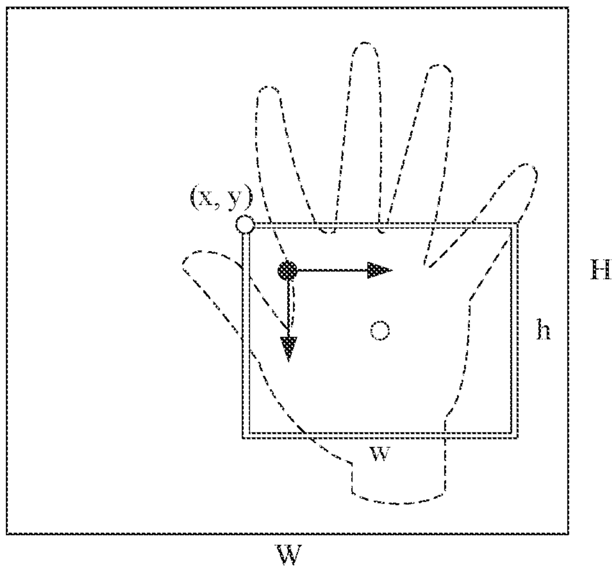
FIG. 8B is a schematic diagram of offset of a key area according to some embodiments.

For example, as shown in FIG. 8B, a coordinate of a center of the acquisition range of the image acquisition element (represented by a solid black circle in the figure), that is, the preset position within the acquisition range is (W/2, H/2). A coordinate system is established with the preset position as a center coordinate. Assuming that horizontally to the right is a positive direction of an X-axis, and vertically downward is a positive direction of a Y-axis, the acquisition device may determine that a coordinate of a key area center (represented by a dotted circle in the figure) is (x+w/2, y+h/2) based on the detected coordinate (x, y) of the upper left corner of the key area, the width w, and the height h, and determine that offset information of the key area center relative to the preset position on the X-axis and the Y-axis is respectively: dx=x+w/2−W/2 and dy=y+h/2−H/2.

Considering that different devices have different hardware conditions, image resolutions may be different. Therefore, in some embodiments, the normalization processing is performed on the offset information. For example, the offset ratio of the key area center relative to the preset position may be obtained by using dx'=dx/(W/2) and dy'=dy/(H/2). During the normalization processing, the symbol information of the offset is retained. The symbol information includes "+" and "−" that respectively represent a positive direction and a negative direction of a coordinate axis.

Therefore, a change of the plane position of the key area of the target part within the acquisition range of the image acquisition element, that is, the offset of the key area in the plane relative to the center of the camera, may be correctly displayed by using the offset ratio and the symbol information. Therefore, intuitive feedback can be provided on the target object, facilitating a quick adjustment for the target position by the target object.

Considering that it is difficult for the target part to accurately maintain a posture, in some embodiments, at least three distance sensors are deployed around the image acquisition element, and the enabling the display state of the currently displayed mapping pattern to change as the relative position changes, when the relative position of the target part relative to the image acquisition element changes includes: obtaining at least three effective distances corresponding to the key area of the target part by using the distance sensors when the target part is within the acquisition range of the image acquisition element; constructing a virtual plane of the key area based on the at least three effective distances; determining a relative posture of the key area based on a relative angle between the virtual plane and a standard plane; and adjusting the display state of the mapping pattern based on the relative posture.

Specifically, when the target part is within the acquisition range of the image acquisition element, the target part is within a detectable range of the at least three distance sensors. In other words, the at least three distance sensors are covered by a projection area of the key area of the target part projected to a plane at which the distance sensors is located. Therefore, the acquisition device may obtain the at least three effective distances outputted by the distance sensors. The acquisition device constructs the virtual plane of the key area corresponding to the posture of the current target part based on the at least three effective distances. Therefore, the acquisition device determines a relative posture of the key arca, that is, an inclination posture of the current target part, based on the relative angle between the virtual plane and the standard plane (for example, a tangential angle). Therefore, based on the inclination posture of the current target part, the acquisition device may adjust the display state of the mapping pattern based on the relative posture by using the display element.

For example, the acquisition device calculates components of the acquisition device in a height direction and a plane direction based on the relative posture of the key area, and respectively maps the components into change amounts of the mapping pattern in the display position and the display size, thereby reflecting a current inclination posture of the target part.

Therefore, when the posture of the target part changes or the posture of the target part is inclined to a specific extent, real-time feedback may also be provided via the display state of the mapping pattern. In this way, it can be ensured that the acquired image is accurate, and identity authentication accuracy is further improved.

Figure 9:
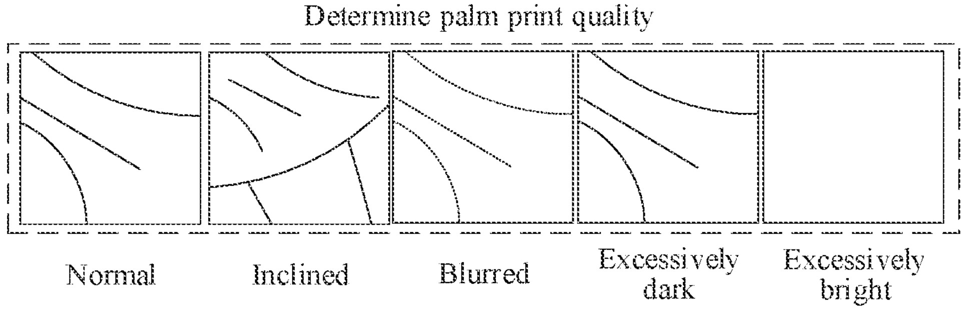
FIG. 9 is a schematic diagram of a palm print image quality according to some embodiments.

As shown in FIG. 9, when the target part is inclined, moves excessively fast, is excessively close or excessively far, or is excessively dark or excessively bright due to another factor, the image of the acquired key area also has various situations. As a result, image quality is difficult to satisfy a standard for the identity authentication, or the identity authentication fails or has low accuracy. Therefore, to ensure that an acquired image quality satisfies the standard for the identity authentication, in some embodiments, before the acquiring a key arca image of the target part by using the image acquisition element, the method further includes: obtaining movement speed of the target part within the acquisition range of the image acquisition element. When movement speed is excessively fast, the acquired image may be blurred, affecting accuracy of subsequent steps.

Specifically, the acquisition device determines, based on continuous multi-frame images of the target part detected by the image acquisition element, and based on at least one of the change amount of the spatial height or the offset of the plane position of the key area corresponding to the continuous multi-frame images, the movement speed of the target part. For example, the acquisition device calculates a change amount of a spatial height between each two adjacent frames based on consecutive N-frame images of the target part detected by the image acquisition element. When the change amount is less than a preset threshold, the acquisition device determines that the movement speed of the target part is proper and an acquisition condition is satisfied.

For another example, the acquisition device calculates an offset of a plane position between each two adjacent frames based on consecutive N-frame images of the target part detected by the image acquisition element. When the offset is less than a preset threshold, the acquisition device determines that the movement speed of the target part is proper and an acquisition condition is satisfied.

For still another example, only when the change amount of the spatial height and the offset of the plane position between each two adjacent frames satisfy a corresponding threshold condition, the acquisition device determines that the movement speed of the target part is proper, an acquisition condition is satisfied, and so on.

Therefore, when based on the movement speed, it is determined that the detected target part satisfies an acquisition condition, the acquisition device performs the operation of acquiring a key area image of the target part by using the image acquisition element. In addition, a situation in which the target part moves excessively fast within the visual range of the image acquisition element, resulting in an acquisition failure or a low acquired image quality is avoided. In this way, accuracy and a success rate of acquisition is improved, and acquisition efficiency is further improved.

Considering that a key area in an actual scenario may be blocked by another object (for example, a palm is blocked by a sleeve), to ensure acquisition accuracy, in another embodiment, before the acquiring a key area image of the target part by using the image acquisition element, the method further includes: performing integrity detection on the target part within the acquisition range of the image acquisition element, to obtain an integrity detection result. Specifically, the acquisition device obtains an image of the target part by using the image acquisition element, and performs the integrity detection on the image of the target part, to obtain an integrity detection result. The integrity detection result is used for representing whether the key area of the target part is complete, in other words, whether the key area is blocked. When the target part is not blocked, the acquisition device determines that the target part satisfies the acquisition condition.

For example, the acquisition device may perform the integrity detection on the image of the target part in a manner of determining a skin color. For example, the acquisition device extracts a pixel value in the key area of the target part and compares the pixel value in the key area of the target part with a pixel value in a non-key area. When a difference between the pixel value in the key area of the target part and the pixel value in the non-key area exceeds a threshold, the key area is blocked. For another example, the acquisition device may use a pre-trained classification model to input the image of the target part into the classification model, and the classification model outputs an integrity detection result of whether there is occlusion.

Therefore, when based on the integrity detection result, it is determined that the detected target part satisfies an acquisition condition, the acquisition device performs the operation of acquiring a key area image of the target part by using the image acquisition element.

In still another embodiment, to further ensure acquisition accuracy and further protect identity authentication accuracy, when based on both the movement speed and the integrity detection result satisfy an acquisition condition, the acquisition device performs the operation of acquiring a key area image of the target part by using the image acquisition element.

In addition, to determine that a current operation is performed under an intention of the target object, and to fully obtain authorization of the target object, before the acquiring a key area image of the target part by using the image acquisition element, when the acquisition device determines that duration for which the image acquisition element detects an image of the target part that satisfies an image quality condition is not less than preset duration, an instruction is issued to enable the image acquisition element to perform acquisition.

Specifically, the acquisition device may obtain a movement speed of the target part within the acquisition range of the image acquisition element. When the movement speed is within a small range, an authentication intention of the target object is satisfied. For example, when at least one of the change amount of the spatial height or the offset in the plane position of the key area corresponding to the continuous N-frame images satisfies a threshold condition, the acquisition device determines, based on continuous N-frame images of the target part detected by the image acquisition element, that an authentication intention of the target object is satisfied. A movement speed range constrained by the threshold condition is to be stricter than a threshold condition set to ensure the image quality.

Therefore, it is ensured that the authorization of the target object can be fully obtained. Before finally acquiring an image, the target object may interrupt an authentication process at any time.

When one or more conditions in the foregoing embodiments are satisfied, the acquisition device acquires a key area image of the target part by using the image acquisition element. Usually, to ensure accuracy of the identity authentication result, the image acquisition element acquires a plurality of key area images, to obtain an accurate identity authentication result by recognizing the plurality of key area images.

Therefore, in some embodiments, the acquiring a key area image of the target part by using the image acquisition element when the currently displayed mapping pattern matches a preset recognition pattern includes: when the currently displayed mapping pattern matches the preset recognition pattern, triggering to output first prompt information, the first prompt information being used for prompting the target object to remain the target part in a current state unchanged; and acquiring the key area image of the target part by using the image acquisition element when the target part remains in the current state unchanged.

The first prompt information is used for prompting the target object to remain the target part in a current state unchanged. In an actual scenario, when the target object remains the current state within a specific range, it may be regarded that the target object remains the target part in the current state unchanged.

Specifically, when the currently displayed mapping pattern matches the preset recognition pattern, the acquisition device is triggered to output the first prompt information. For example, the acquisition device may display the first prompt information in a display interface by using a display element in a form of text, a pattern, an animation, or the like. For another example, the acquisition device may display the first prompt information by using a sound playback element such as a speaker in a form of a voice, music, or the like. The sound playback element may be integrated into the acquisition device or may be disposed independently of the acquisition device. For example, the sound playback element is externally connected to the acquisition device.

Therefore, the acquisition device may acquire the key area image of the target part by using the image acquisition element when the target part remains in the current state unchanged.

In the foregoing embodiments, by outputting the first prompt information and with reference to the display interface that the mapping pattern matches the preset recognition pattern, feedback that the state of the target part satisfies the acquisition condition is provided for the target object in time and clearly, to avoid moving of the target part, so that a completion rate and acquisition efficiency can be improved.

However, when the mapping pattern does not match the preset recognition pattern, feedback may also be provided for the target object to prompt the target object to make an adjustment. In some embodiments, the method further includes: when the currently displayed mapping pattern does not match the preset recognition pattern, triggering to output second prompt information, the second prompt information being used for prompting the target object to adjust the relative position of the target part relative to the image acquisition element, to enable the displayed mapping pattern that changes as the relative position changes to match the preset recognition pattern.

The second prompt information is used for prompting that the current state of the target object does not satisfy the acquisition condition, to guide the target object to adjust the relative position of the target part relative to the image acquisition element, so that the relative position of the target part relative to the image acquisition element is proper, to enable the mapping pattern to match the preset recognition pattern.

Specifically, when the currently displayed mapping pattern does not match the preset recognition pattern, the acquisition device is triggered to output the second prompt information. For example, the acquisition device may display the second prompt information in a display interface by using a display element in a form of text, a pattern, an animation, or the like. For another example, the acquisition device may display the second prompt information by using a sound playback element such as a speaker in a form of a voice, music, or the like.

In some embodiments, when the display size of the currently displayed mapping pattern is larger than a display size of the preset recognition pattern, the acquisition device outputs the second prompt information. The second prompt information is used for prompting the target object to control the target part to be away from the image acquisition element. In some embodiments, when the display size of the currently displayed mapping pattern is smaller than a display size of the preset recognition pattern, the acquisition device outputs the second prompt information. The second prompt information is used for prompting the target object to control the target part to be close to the image acquisition element. Therefore, the spatial height of the target part relative to the image acquisition element can be clearly fed back, facilitating a height adjustment of the target object.

In some embodiments, when the display position of the currently displayed mapping pattern is offset relative to the preset position of the preset recognition pattern, the acquisition device outputs the second prompt information. The second prompt information is used for prompting the target object to adjust the plane position of the target part. For example, when the display position is to the left (or to the right) relative to the preset position, the acquisition device outputs the second prompt information to prompt the target object to adjust the target part to the right (or to the left). Alternatively, when the display position is above (or below) relative to the preset position, the acquisition device outputs the second prompt information to prompt the target object to adjust the target part downward (or upward). Therefore, the offset of the target part relative to the image acquisition element can be clearly fed back, facilitating an orientation adjustment of the target object.

In the foregoing embodiments, when the mapping pattern does not match the preset recognition pattern, the second prompt information is outputted. The target object is prompted to adjust the state of the target part with reference to the display state of the mapping pattern. This way can help the target object to adjust the state of the target part easily, and implement efficient acquisition and identity authentication.

In some embodiments, the method further includes: transmitting the acquired key area image to a server, to enable the server to perform identity authentication on the key area image and perform resource transfer when the identity authentication passes; and when the identity authentication passes, receiving and displaying a resource transfer result fed back by the server.

Specifically, the acquisition device sends the acquired key area image to the server. After receiving the key area image, the server performs identity authentication on the key area image. When the identity authentication passes, the server may perform a resource transfer operation related to the target object. The resource transfer operation refers to that when the identity authentication passes, the server transfers stored preset resources in an account that are pre-bounded to the target object to a specific preset account.

A specific scenario is used as an example. When the target object passes the identity authentication, the server takes out a preset quantity of resources such as property and props from an account of the target object and transfers the resources to another preset account. The preset account may be a merchant account. For example, a specific amount is paid to the merchant account. The preset account may alternatively be another non-merchant account. For example, money is transferred to the non-merchant account, or a virtual prop is transferred to the non-merchant account.

In the foregoing embodiments, by using the non-contact identity authentication method, a requirement for a hardware device is lowered and a situation that inconvenience is caused by forgetting to carry a portable terminal in currently commonly used mobile phone payment and scanning payment is also avoided. In addition, identity authentication is performed by using a palm scanning method for resource transfer. This way is efficient and greatly improves convenience.

This application further provides an application scenario. The foregoing image acquisition method is applied to the application scenario. Specifically, application of the method in the application scenario is as follows. A user places a palm above the image acquisition element. The acquisition device responds to a pattern display operation triggered by the palm of the user, to display a mapping pattern corresponding to a palm area of the palm by using the display element. When a relative position of the palm area of the palm relative to the image acquisition element changes, a display state of the displayed mapping pattern also changes as the relative position changes, providing real-time and intuitive feedback for the user, to guide the user to adjust a height and a position of the palm during payment. When the currently displayed mapping pattern matches a preset recognition pattern, a palm area image of the target part is acquired by using the image acquisition element to perform identity authentication on the user. Certainly, this is not limited herein. The image acquisition method provided in this application may further be applied to other application scenarios, such as a palm scanning passage gate and an airport/train station ticket inspection.

For example, when the user passes through a gate, a palm is placed above a camera disposed in the gate and palm authentication is performed. In this process, a mapping pattern corresponding to a palm area may be displayed by using the gate or an external display screen connected to the gate, to enable the user to make an adjustment. When the mapping pattern matches a preset recognition pattern, the camera acquires a palm area image to perform identity authentication on the user. After the identity authentication passes, the user can successfully pass through the gate.

Figure 10:
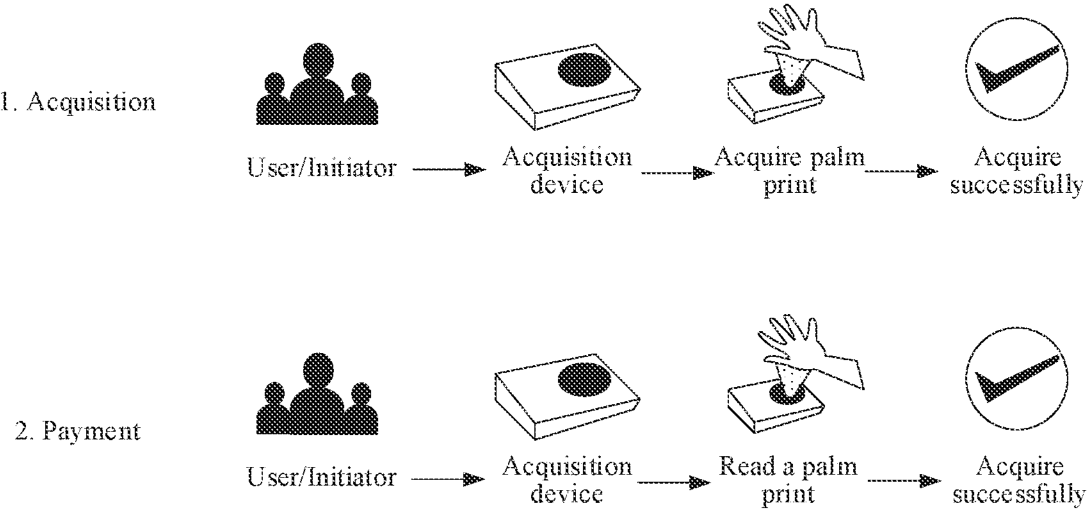
FIG. 10 is a schematic diagram of scenarios of palm scanning acquisition and palm scanning payment according to some embodiments.

The following uses a specific application scenario of palm scanning acquisition and palm payment as an example for description. As shown in FIG. 10, a user or an initiator of palm scanning acquisition/payment acquires a palm print by using a palm scanning device. An acquisition device acquires or reads the palm print by using an image acquisition element, and prompts the user whether the acquisition is successful or not. Therefore, when paying in different scenarios, the user can extend the palm to pay directly. This is convenient and fast. In addition, an efficient interactive prompt may effectively guide the user to perform palm print acquisition and palm print payment.

In a process of acquiring a palm print, the acquisition device displays the mapping pattern by using the display element. When the palm of the user is close to the acquisition device, the recognized palm is mapped to a display interface and is displayed in a circle. As a distance between the palm and the device changes, the interface also provides corresponding feedback, greatly improving a payment completion rate. Therefore, the recognized key part "palm" of the palm payment is mapped to the display interface in a circle, so that the user easily recognizes the key part. In addition, the distance between the acquisition device and the palm is displayed in the display interface to display a relationship that something looks small in the distance and big on the contrary, so that the user adjusts a proper distance conveniently. That the circle mapped by the palm and a key recognition arca are overlapped helps the user to easily adjust a palm position during paying.

Figure 11A:
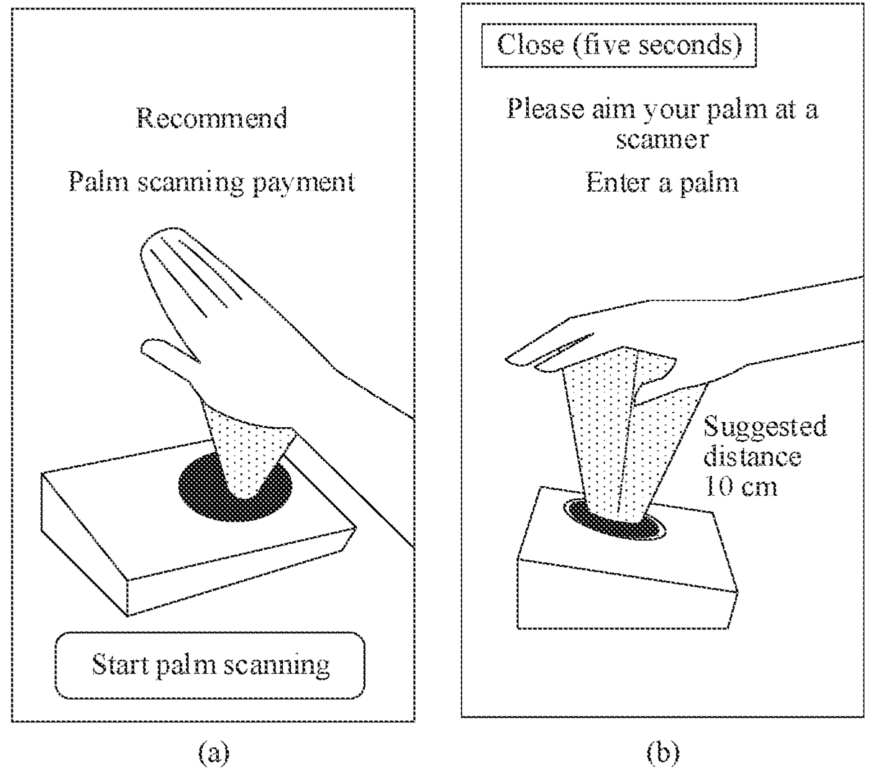
FIG. 11A is a schematic diagram of guidance of a display interface according to some embodiments.

To improve user experience, as shown in FIG. 11A, before a user triggers a pattern display operation, an acquisition device also displays, by using the display element, an interface to guide the user for palm scanning, as shown in section (a) in FIG. 11A, and may also display an interface to guide the user to enter a palm, as shown in section (b) in FIG. 11A.

Figure 11B:
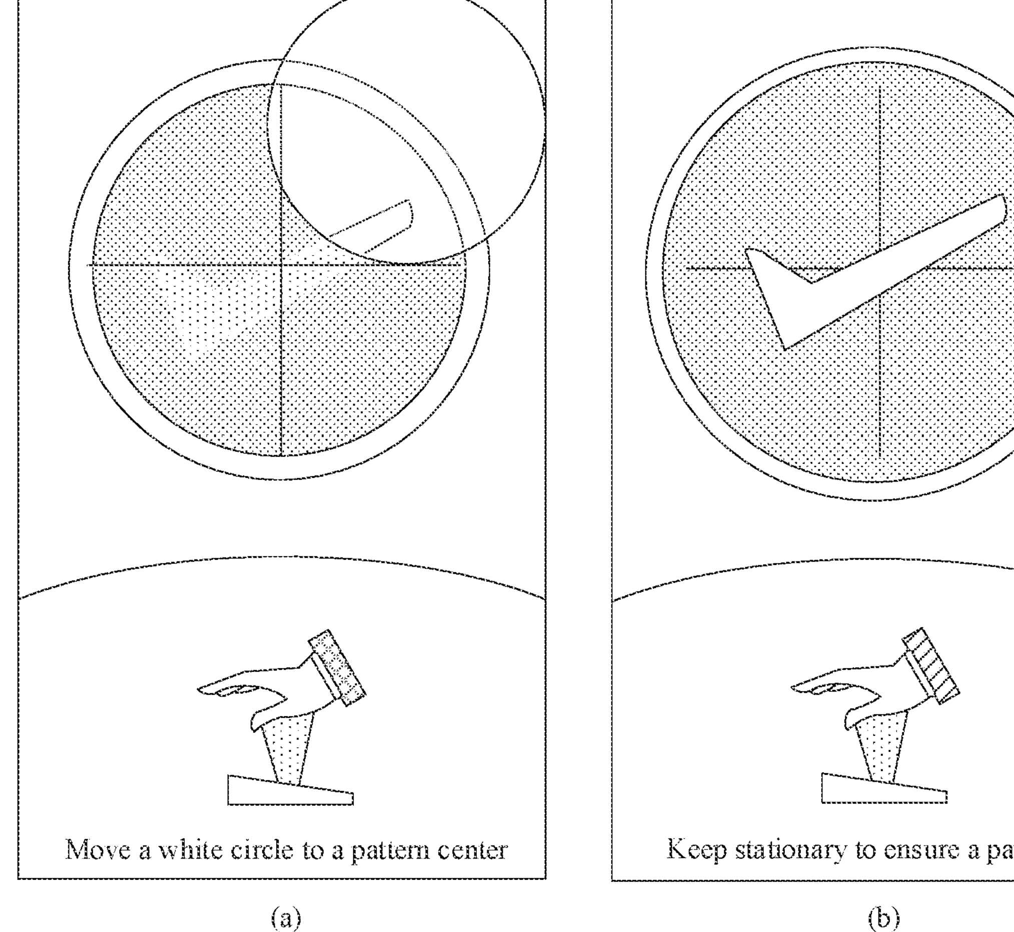
FIG. 11B is a schematic diagram of guidance of a display interface according to some other embodiments.

In a process of acquiring a palm print, as a relative position of the palm changes, a display state of a mapped circle also changes as the relative position changes. As shown in section (a) in FIG. 11B, the palm of the user is mapped into a circle. An orientation of the circle relative to a preset recognition pattern (a filling area formed by the circle and a cross) reflects a plane position of the palm relative to the acquisition device. In addition, a size of the circle reflects a spatial height of the palm relative to the acquisition device. The acquisition device further outputs second prompt information by using the display element to prompt the user to adjust a position of the palm, so as to move the circle into the preset recognition pattern displayed on the interface. As shown in section (b) in FIG. 11B, when the circle is filled with the preset recognition pattern, in other words, the mapping pattern matches the preset recognition pattern, the image acquisition element is triggered to acquire a palm area image. In this process, the acquisition device further outputs first prompt information by using the display element to prompt the user to remain in a state of the palm unchanged.

Figure 11C:
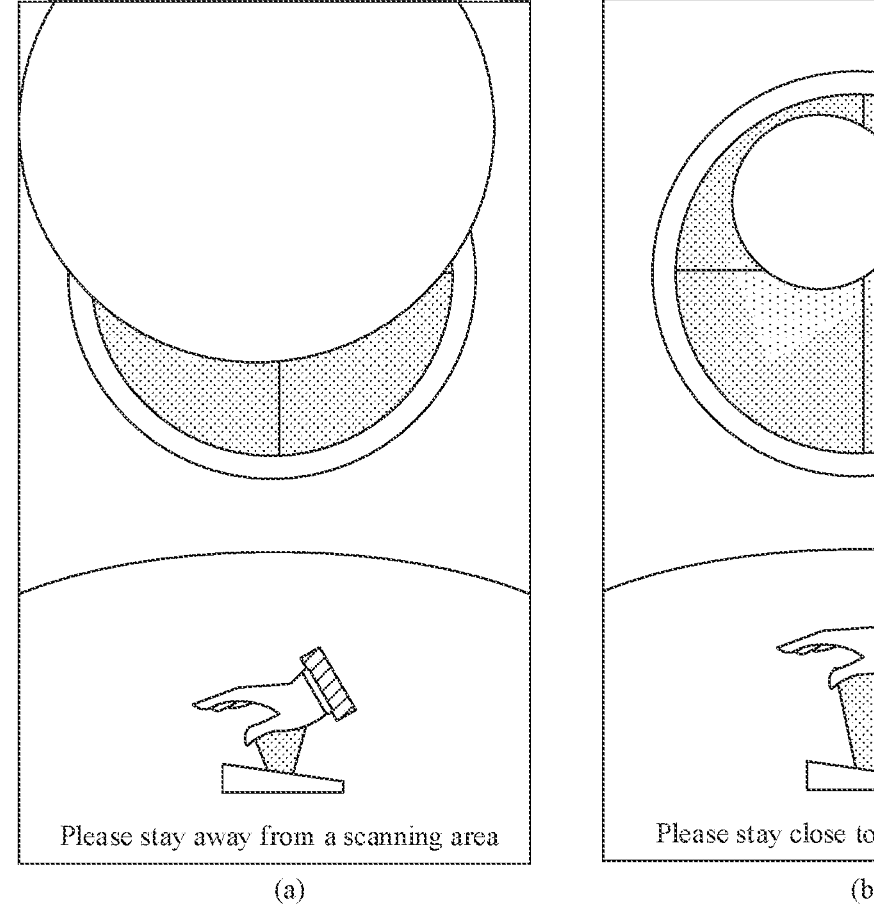
FIG. 11C is a schematic diagram of guidance of a display interface according to some still other embodiments.

When a height of the palm relative to the image acquisition element (that is, a scanning area in the figure) is excessively low, as shown in section (a) in FIG. 11C, that the circle is excessively large reflects that the spatial height of the palm relative to the image acquisition element is excessively low. Therefore, the acquisition device outputs the second prompt information by using the display element to prompt the user to adjust the height of the palm to be away from the image acquisition element. In contrast, when a height of the palm relative to the image acquisition element is excessively high, as shown in section (b) in FIG. 11C, that the circle is excessively small reflects that the spatial height of the palm relative to the image acquisition element is excessively high. Therefore, the acquisition device outputs the second prompt information by using the display element to prompt the user to adjust the height of the palm to be close to the image acquisition element.

In some embodiments, the display element may alternatively be demonstrated by an animation to guide the users to make an adjustment. As shown in section (a) and section (b) in FIG. 11D, an animation manner is used to perform prompt. In the animation, the acquisition device remains stationary to demonstrate upward displacement of the palm, so as to guide the user to adjust the palm away from the image acquisition element. Alternatively, in the animation, the acquisition device remains stationary to demonstrate downward displacement of the palm, so as to guide the user to adjust the palm close to the image acquisition element.

In some embodiments, the prompt may alternatively be given by displaying different colors. For example, when the palm is excessively close, a red color is used to prompt that the palm needs to be away from the device, and when the palm is excessively far, a red color is used to prompt that the palm needs to be close to the device. However, when the palm moves up or down to a proper height, a white color is used to prompt that the height is proper.

Figure 12:
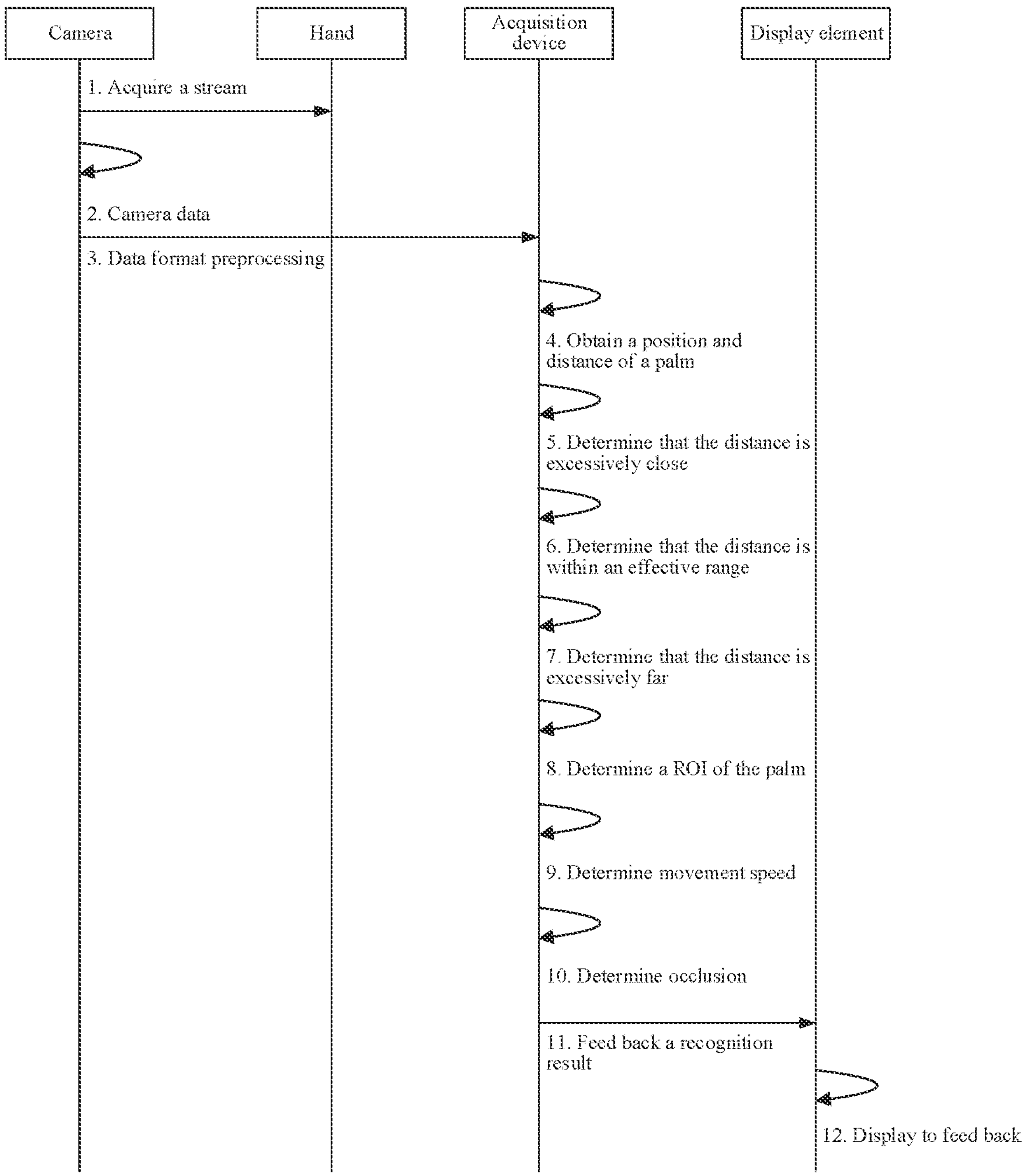
FIG. 12 is a schematic diagram of an acquisition process according to some embodiments.

In a specific example, a flow of the foregoing image acquisition method may be shown in FIG. 12, including the following steps. A camera acquires an image stream. When a palm is detected, an acquisition device processes acquired image data. First, the image data satisfies a subsequent data format requirement through data format preprocessing. The acquisition device separately obtains a position and a distance of the palm based on a detected image, and determines that the distance is excessively close, excessively far, or within an effective range. In addition, the acquisition device determines a region of interest (ROI) of the palm, ensuring that a key area of the palm is within an acquisition range of the image acquisition device, to avoid distortion caused by the key area of the palm in an edge position of a visual range. In addition, the acquisition device further determines movement speed and occlusion, to ensure that acquired image quality satisfies the standard. Step 4 to step 10 in FIG. 12 are a process of image recognition. When all of the foregoing conditions are satisfied, the acquisition device feeds back a recognition result in a manner of mapping an image by using the display interface, and feeds back the position and the height of the palm via the mapping pattern, to prompt and guide the user.

Figure 13:
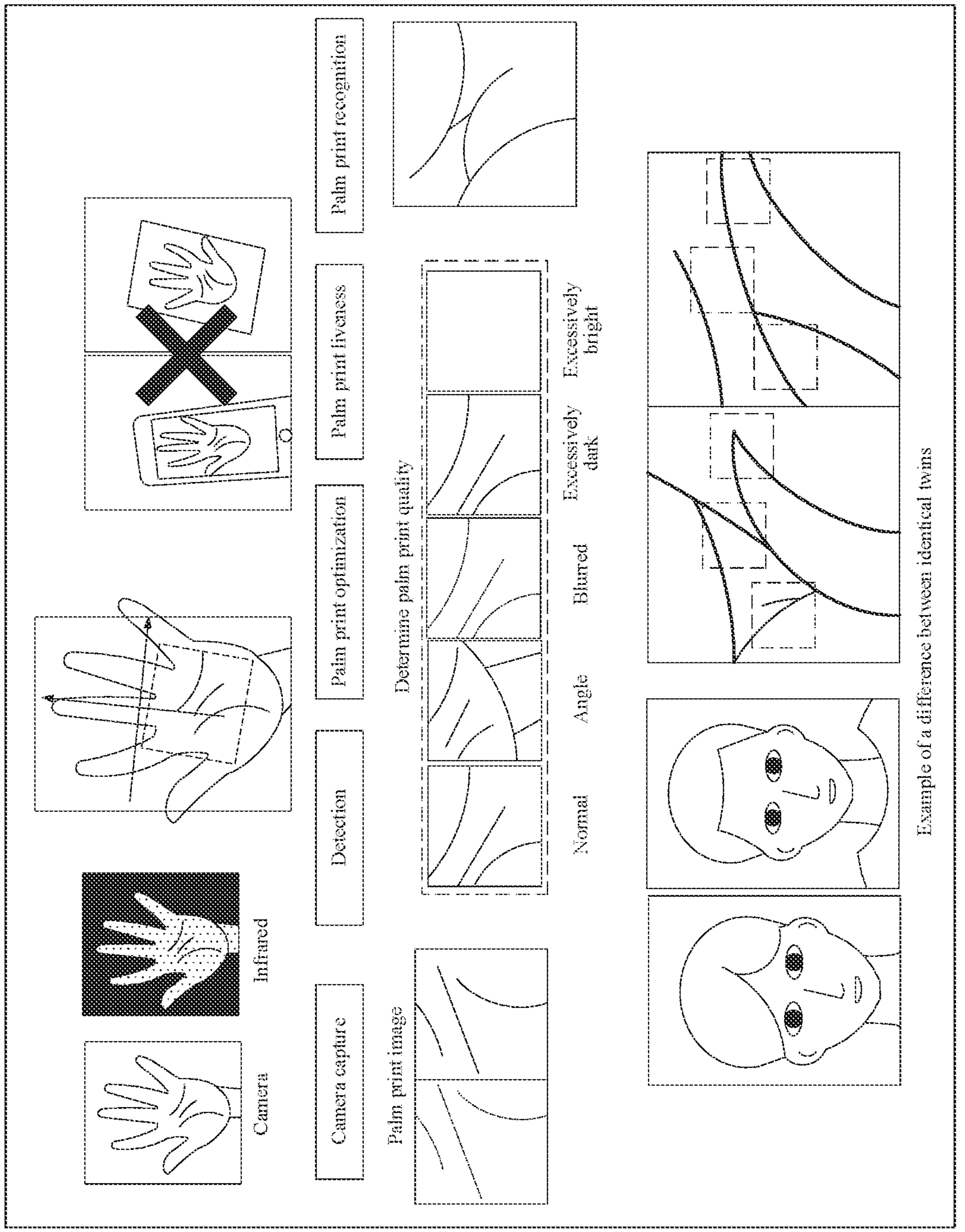
FIG. 13 is a schematic diagram of a palm print recognition scenario according to some embodiments.

According to the image acquisition method provided in one or more of the foregoing embodiments, as shown in FIG. 13, an image of a key area of a hand is detected by a camera, liveness detection is performed by an infrared sensor, and palm print optimization is performed by determining palm print quality. An image satisfying an image quality condition is acquired for identity authentication. In this way, a difficulty of distinguishing identical twins in a face recognition is avoided, so that recognition accuracy can be effectively improved.

In a specific embodiment, when object detection and liveness detection are satisfied, or it is determined that a detected target part satisfies an acquisition condition based on at least one of movement speed or an integrity detection result, the acquisition device displays a mapping pattern corresponding to a key area of a target part in response to a pattern display operation triggered by the target part of a target object.

A display size of the currently displayed mapping pattern changes in an opposite direction as the spatial height changes, when the spatial height of the target part relative to the image acquisition element changes. In other words, when the spatial height of the target part relative to the image acquisition element becomes greater, the display size of the currently displayed mapping pattern decreases as the spatial height increases. When the spatial height of the target part relative to the image acquisition element becomes smaller, the display size of the currently displayed mapping pattern is enabled to increase as the spatial height decreases.

Technically, a plurality of distance sensors are deployed around the image acquisition element. The acquisition device obtains a plurality of effective distances corresponding to the key area of the target part by using the plurality of distance sensors when the target part is within the acquisition range of the image acquisition element. The current spatial height of the target part relative to the image acquisition element is determined based on the plurality of effective distances. The spatial height is mapped to a current display size based on a preset distance mapping relationship. A greater spatial height indicates a smaller mapped current display size. The display size of the mapping pattern is adjusted to the current display size to update and display.

In addition, a display position of the currently displayed mapping pattern is enabled to change in a same direction as a plane position of the key area of the target part changes within an acquisition range of the image acquisition element. Technically, the plane position of the key area of the target part within the acquisition range of the image acquisition element is obtained. Offset information of the plane position relative to a preset position within the acquisition range is determined. Normalization processing is performed on the offset information based on the acquisition range, to obtain an offset ratio. The current display position of the mapping pattern in a current display interface is determined based on symbol information carried in the offset information and the offset ratio. The display position of the mapping pattern is adjusted to the current display position to update and display.

In addition, considering that an angle of the target part changes, at least three distance sensors are deployed around the image acquisition element. At least three effective distances corresponding to the key area of the target part is obtained by using the distance sensors when the target part is within the acquisition range of the image acquisition element. A virtual plane of the key area is constructed based on the at least three effective distances. A relative posture of the key area is determined based on a relative angle between the virtual plane and a standard plane. The display state of the mapping pattern is adjusted based on the relative posture.

In a situation, when the currently displayed mapping pattern matches the preset recognition pattern, the acquisition device is triggered to output first prompt information, the first prompt information being used for prompting the target object to remain the target part in a current state unchanged. The key area image of the target part is acquired by using the image acquisition element when the target part remains in the current state unchanged. The key area image of the target part is acquired by using the image acquisition element. The key area image is used for performing identity authentication on the target object.

In another situation, when the currently displayed mapping pattern does not match the preset recognition pattern, the acquisition device is triggered to output second prompt information, the second prompt information being used for prompting the target object to adjust the relative position of the target part relative to the image acquisition element, to enable the displayed mapping pattern that changes as the relative position changes to match the preset recognition pattern.

It is to be understood that although various steps in flowcharts according to each embodiment are displayed in sequence based on indication of arrows, the steps are not necessarily performed in sequence based on a sequence indicated by the arrows. Unless otherwise explicitly specified in this application, execution of the steps is not strictly limited, and the steps may be performed in other sequences. In addition, at least some of the steps in the flowcharts according to each embodiment may include a plurality of steps or a plurality of stages. These steps or stages are not necessarily performed at same time, but may be performed at different time instants. These steps or stages are not necessarily performed in sequence, but the steps or stages may be performed in turn or alternately with other steps or at least some steps or stages of other steps.

Based on a same inventive concept, an embodiment of this application further provides an image acquisition apparatus for implementing the foregoing image acquisition method. The solutions to the problem provided by the apparatus are similar to the solutions described in the foregoing method. Therefore, for a specific limitation of one or more image acquisition apparatus embodiments provided below, refer to a limitation of the image acquisition method above. Details are not described again herein.

Figure 14:
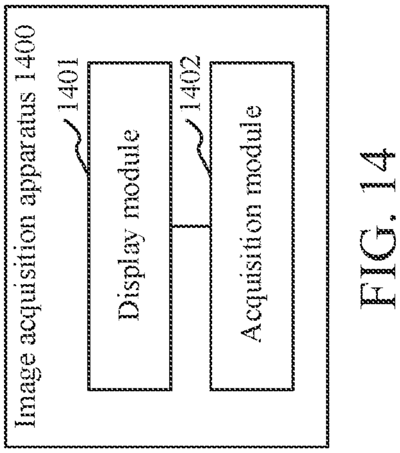
FIG. 14 is a block diagram of a structure of an image acquisition apparatus according to some embodiments.

In some embodiments, as shown in FIG. 14, an image acquisition apparatus 1400 is provided, including: a display module 1401 and an acquisition module 1402.

The display module 1401 is configured to display, by controlling a display element, a mapping pattern corresponding to a key area of a target part, in response to a pattern display operation triggered by the target part of a target object, a display state of the mapping pattern being related to a relative position of the target part relative to an image acquisition element.

The display module 1401 is further configured to enable the display state of the currently displayed mapping pattern to change as the relative position changes, when the relative position of the target part relative to the image acquisition element changes, the display state including at least one of a display position or a display size.

The acquisition module 1402 is configured to acquire a key area image of the target part contactlessly by using the image acquisition element when the currently displayed mapping pattern matches a preset recognition pattern; the key area image being used for performing identity authentication on the target object.

In some embodiments, the display module is further configured to: enable a display size of the currently displayed mapping pattern to change in an opposite direction as the spatial height changes, when the spatial height of the target part relative to the image acquisition element changes; and enable a display position of the currently displayed mapping pattern to change in a same direction as a plane position of the key area of the target part changes within an acquisition range of the image acquisition element.

In some embodiments, the display module is further configured to: when the spatial height of the target part relative to the image acquisition element becomes greater, enable the display size of the currently displayed mapping pattern to decrease as the spatial height increases; and when the spatial height of the target part relative to the image acquisition element becomes smaller, enable the display size of the currently displayed mapping pattern to increase as the spatial height decreases.

In some embodiments, the display module is further configured to: determine a current spatial height of the target part of the target object relative to the image acquisition element; map the spatial height to a current display size based on a preset distance mapping relationship, a greater spatial height indicating a smaller mapped current display size; and adjust the display size of the mapping pattern to the current display size to update and display.

In some embodiments, a plurality of distance sensors are deployed around the image acquisition element. The display module is further configured to: obtain a plurality of effective distances corresponding to the key area of the target part by using the plurality of distance sensors when the target part is within the acquisition range of the image acquisition element; determine the current spatial height of the target part relative to the image acquisition element based on the plurality of effective distances.

In some embodiments, the display module is further configured to: obtain the plane position of the key area of the target part within the acquisition range of the image acquisition element; determine offset information of the plane position relative to a preset position within the acquisition range; and determine a current display position of the mapping pattern based on the offset information, and adjust the display position of the mapping pattern to the current display position to update and display.

In some embodiments, the display module is further configured to: perform normalization processing on the offset information based on the acquisition range, to obtain an offset ratio; and determine the current display position of the mapping pattern in a current display interface based on symbol information carried in the offset information and the offset ratio.

In some embodiments, at least three distance sensors are deployed around the image acquisition element. The display module is further configured to: obtain at least three effective distances corresponding to the key area of the target part by using the distance sensors when the target part is within the acquisition range of the image acquisition element; construct a virtual plane of the key area based on the at least three effective distances; determine a relative posture of the key area based on a relative angle between the virtual plane and a standard plane; and adjust the display state of the mapping pattern based on the relative posture.

In some embodiments, the apparatus further includes a first detection module, configured to: obtain movement speed of the target part within the acquisition range of the image acquisition element; perform integrity detection on the target part within the acquisition range of the image acquisition element, to obtain an integrity detection result; and when based on at least one of the movement speed and the integrity detection result, it is determined that the detected target part satisfies an acquisition condition, perform the operation of acquiring a key area image of the target part by using the image acquisition element.

In some embodiments, the acquisition module is further configured to: when the currently displayed mapping pattern matches the preset recognition pattern, trigger to output first prompt information, the first prompt information being used for prompting the target object to remain the target part in a current state unchanged; and acquire the key area image of the target part by using the image acquisition element when the target part remains in the current state unchanged.

In some embodiments, the apparatus further includes a prompt module, configured to: when the currently displayed mapping pattern does not match the preset recognition pattern, trigger to output second prompt information, the second prompt information being used for prompting the target object to adjust the relative position of the target part relative to the image acquisition element, to enable the displayed mapping pattern that changes as the relative position changes to match the preset recognition pattern.

In some embodiments, when the display size of the currently displayed mapping pattern is larger than a display size of the preset recognition pattern, the second prompt information is used for prompting the target object to control the target part to be away from the image acquisition element.

In some embodiments, when the display size of the currently displayed mapping pattern is smaller than a display size of the preset recognition pattern, the second prompt information is used for prompting the target object to control the target part to be close to the image acquisition element.

In some embodiments, the apparatus further includes a second detection module, configured to: perform object detection and liveness detection on a target within the acquisition range of the image acquisition element; and when it is detected that the target is the target part of the target object and liveness is detected, determine that the target part of the target object triggers the pattern display operation.

In some embodiments, the apparatus further includes a communication module, configured to: transmit the acquired key area image to a server, to enable the server to perform identity authentication on the key area image, and perform resource transfer when the identity authentication passes; and when the identity authentication passes, receive and display a resource transfer result fed back by the server. The display module is further configured to display the resource transfer result.

All or some of the modules in the foregoing image acquisition apparatus may be implemented by software, hardware, and a combination thereof. The modules may be embedded in or independent of a processor in a computer device in a form of hardware, and may alternatively be stored in a memory in the computer device in a form of software, so that the processor may call and perform operations corresponding to each module.

In some embodiments, a computer device is provided. The computer device may be the acquisition device in the foregoing embodiments, and an internal structure diagram of the computer device may be shown in FIG. 15. The computer device includes a processor, a memory, an input/output interface, a communication interface, a display element, and an image acquisition element. The processor and the memory are connected to the input/output interface via a system bus. The communication interface, the display element, and the image acquisition element are connected to the system bus via the input/output interface. The processor of the computer device is configured to provide a computation and control capability. The memory of the computer device includes a non-volatile storage medium and an internal memory. The non-volatile storage medium stores an operating system and a computer program. The internal memory provides an environment for running of the operating system and the computer program in the non-volatile storage medium. The input/output interface of the computer device is configured to exchange information between the processor and an external device. The communication interface of the computer device is configured to communicate with an external terminal in a wired or wireless manner. A wireless manner may be implemented by Wi-Fi, a mobile cellular network, near field communication (NFC), or another technology. When the computer program is executed by the processor, an image acquisition method is implemented. The display element of the computer device is configured to form a visually visible picture, and may be a display, a projection apparatus, or a virtual reality imaging apparatus. The display may be a liquid crystal display or an e-ink display. An input apparatus of the computer device may be a touch layer covering the display, may be a button, a trackball, or a touchpad disposed on a housing of the computer device, or may be an external keyboard, touchpad, mouse, or the like.

Figure 15:
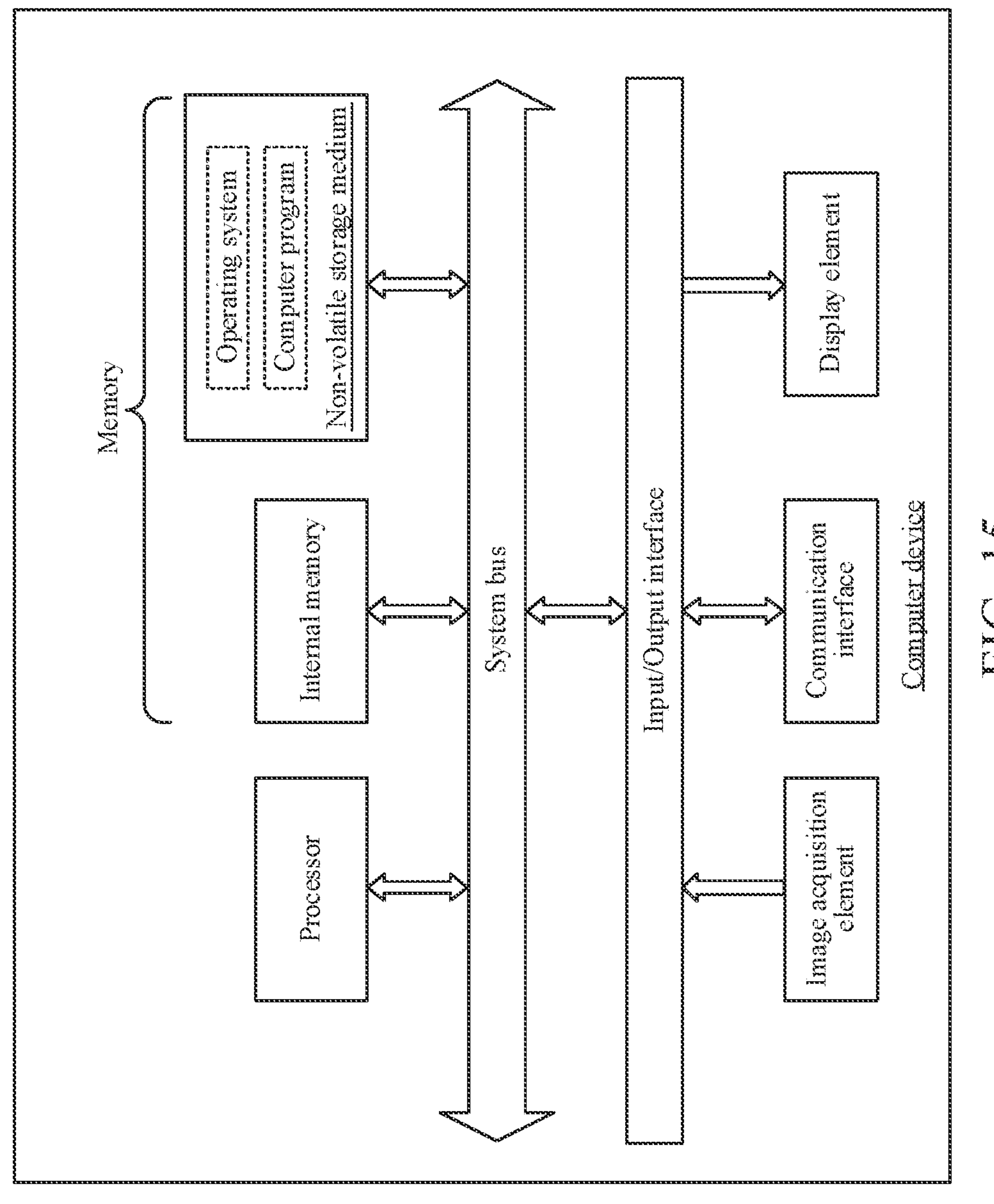
FIG. 15 is a diagram of an internal structure of a computer device according to some embodiments.

A person skilled in the art may understand that the structure shown in FIG. 15 is only a block diagram of a partial structure related to a solution in this application, and does not constitute a limitation to the computer device to which the solution in this application is applied. Specifically, the computer device may include more components or fewer components than those shown in the figure, or some components may be combined, or a different component deployment may be used.

In some embodiments, a computer device is further provided, and includes a memory and a processor. The memory has a computer program stored therein, and when the processor executes the computer program, the operations in each method embodiment are implemented.

In some embodiments, a computer-readable storage medium is provided, and has a computer program stored thereon. When the computer program is executed by a processor, the operations in each method embodiment are implemented.

In some embodiments, a computer program product is provided, and includes a computer program. When the computer program are executed by a processor, the operations in each method embodiment are implemented.

User information (including but not limited to user palm print information, user account information, and the like) and data (including but not limited to data used for analysis, stored data, displayed data, and the like), included in this application are information and data that all authorized by a user or fully authorized by parties. Collection, use, and processing of related data need to comply with relevant laws, regulations, and standards of relevant countries and regions.

A person of ordinary skill in the art understands that all or some of procedures of the method in the foregoing embodiments may be implemented by a computer program instructing relevant hardware. The computer program may be stored in a non-volatile computer-readable storage medium. When the computer program is executed, the procedures of the foregoing method embodiments may be implemented. References to the memory, the database, or other medium used in the embodiments provided in this application may all include at least one of a non-volatile or a volatile memory. The non-volatile memory may include a read-only memory (ROM), a magnetic tape, a floppy disk, a flash memory, an optical memory, a high-density embedded non-volatile memory, a resistive random access memory (ReRAM), a magneto-resistive random access memory (MRAM), a ferroelectric random access memory (FRAM), a phase change memory (PCM), a graphene memory, and the like. The volatile memory may include a random access memory (RAM), an external cache, or the like. As a description and not a limitation, the RAM may be in various forms, such as a static random access memory (SRAM) or a dynamic random access memory (DRAM). The database involved in various embodiments provided in this application may include at least one of a relational database and a non-relational database. The non-relational database may include a blockchain-based distributed database and the like, which is not limited herein. The processor involved in various embodiments provided in this application may be a general processor, a central processing unit, a graphics processor, a digital signal processor, a programmable logic, a data processing logic based on quantum computing, or the like, which is not limited herein.

Technical features of the foregoing embodiments may be randomly combined. To make description concise, not all possible combinations of the technical features in the foregoing embodiments are described. However, the combinations of these technical features are considered as falling within the scope recorded by this specification provided that no conflict exists.

In this application, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module. The embodiments only show several implementations of this application and are described in detail, but they should not be construed as a limit to the patent scope of this application. It is to be noted that for a person of ordinary skill in the art, several transformations and improvements can be made without departing from the idea of this application. These transformations and improvements belong to the protection scope of this application. Therefore, the protection scope of this application shall be subject to the appended claims.

What is claimed is:

1. An image acquisition method performed by a computer device, and the method comprising:

displaying a mapping pattern corresponding to a key area of a target part of a target object in response to a pattern display operation triggered by the target object;

changing a display state of the currently displayed mapping pattern when a relative position of the target part relative to an image acquisition element changes, further including:

obtaining at least three effective distances corresponding to the key area of the target part by using at least three distance sensors when the target part is within an acquisition range of the image acquisition element, wherein the at least three distance sensors are evenly distributed around the image acquisition element;

constructing a virtual plane of the key area based on the at least three effective distances;

determining a relative posture of the key area based on a relative angle between the virtual plane and a standard plane; and adjusting the display state of the mapping pattern based on the relative posture; and acquiring a key area image of the target part contactlessly by using the image acquisition element when the currently displayed mapping pattern matches a preset recognition pattern.

2. The method according to claim 1, wherein the changing a display state of the currently displayed mapping pattern when a relative position of the target part relative to an image acquisition element changes comprises:

changing a display size of the currently displayed mapping pattern in an opposite direction as a spatial height changes in an opposite direction, when the spatial height of the target part relative to the image acquisition element changes; and changing a display position of the currently displayed mapping pattern in a same direction as a plane position of the key area of the target part changes within an acquisition range of the image acquisition element.

3. The method according to claim 1, wherein the method further comprises:

obtaining movement speed of the target part within the acquisition range of the image acquisition element;

performing integrity detection on the target part within the acquisition range of the image acquisition element, to obtain an integrity detection result; and performing the operation of acquiring a key area image of the target part by using the image acquisition element when it is determined, based on at least one of the movement speed or the integrity detection result, that the detected target part satisfies an acquisition condition.

4. The method according to claim 1, wherein the acquiring a key area image of the target part contactlessly by using the image acquisition element when the currently displayed mapping pattern matches a preset recognition pattern comprises:

when the currently displayed mapping pattern matches the preset recognition pattern, triggering to output first prompt information, the first prompt information being used for prompting the target object to remain the target part in a current state unchanged; and acquiring the key area image of the target part by using the image acquisition element when the target part remains in the current state unchanged.

5. The method according to claim 1, wherein the method further comprises:

when the currently displayed mapping pattern does not match the preset recognition pattern, triggering to output second prompt information, the second prompt information being used for prompting the target object to adjust the relative position of the target part relative to the image acquisition element, to enable the displayed mapping pattern that changes as the relative position changes to match the preset recognition pattern.

6. The method according to claim 1, wherein the method further comprises:

performing object detection and liveness detection on an object within the acquisition range of the image acquisition element; and when it is detected that the object is the target part of the target object and liveness is detected, determining that the target part of the target object triggers the pattern display operation.

7. The method according to claim 1, wherein the method further comprises:

transmitting the acquired key area image to a server, to enable the server to perform identity authentication on the key area image and perform resource transfer when the identity authentication passes; and when the identity authentication passes, receiving and displaying a resource transfer result fed back by the server.

8. A computer device, comprising a memory and a processor, the memory having a computer program stored therein that, when executed by the processor, causes the computer device to perform an image acquisition method including:

displaying a mapping pattern corresponding to a key area of a target part of a target object in response to a pattern display operation triggered by the target object;

changing a display state of the currently displayed mapping pattern when a relative position of the target part relative to an image acquisition element changes, further including:

obtaining at least three effective distances corresponding to the key area of the target part by using at least three distance sensors when the target part is within an acquisition range of the image acquisition element, wherein the at least three distance sensors are evenly distributed around the image acquisition element;

constructing a virtual plane of the key area based on the at least three effective distances;

determining a relative posture of the key area based on a relative angle between the virtual plane and a standard plane; and adjusting the display state of the mapping pattern based on the relative posture; and acquiring a key area image of the target part contactlessly by using the image acquisition element when the currently displayed mapping pattern matches a preset recognition pattern.

9. The computer device according to claim 8, wherein the changing a display state of the currently displayed mapping pattern when a relative position of the target part relative to an image acquisition element changes comprises:

changing a display size of the currently displayed mapping pattern in an opposite direction as a spatial height changes in an opposite direction, when the spatial height of the target part relative to the image acquisition element changes; and changing a display position of the currently displayed mapping pattern in a same direction as a plane position of the key area of the target part changes within an acquisition range of the image acquisition element.

10. The computer device according to claim 8, wherein the method further comprises:

obtaining movement speed of the target part within the acquisition range of the image acquisition element;

performing integrity detection on the target part within the acquisition range of the image acquisition element, to obtain an integrity detection result; and performing the operation of acquiring a key area image of the target part by using the image acquisition element when it is determined, based on at least one of the movement speed or the integrity detection result, that the detected target part satisfies an acquisition condition.

11. The computer device according to claim 8, wherein the acquiring a key area image of the target part contactlessly by using the image acquisition element when the currently displayed mapping pattern matches a preset recognition pattern comprises:

when the currently displayed mapping pattern matches the preset recognition pattern, triggering to output first prompt information, the first prompt information being used for prompting the target object to remain the target part in a current state unchanged; and acquiring the key area image of the target part by using the image acquisition element when the target part remains in the current state unchanged.

12. The computer device according to claim 8, wherein the method further comprises:

when the currently displayed mapping pattern does not match the preset recognition pattern, triggering to output second prompt information, the second prompt information being used for prompting the target object to adjust the relative position of the target part relative to the image acquisition element, to enable the displayed mapping pattern that changes as the relative position changes to match the preset recognition pattern.

13. The computer device according to claim 8, wherein the method further comprises:

performing object detection and liveness detection on an object within the acquisition range of the image acquisition element; and when it is detected that the object is the target part of the target object and liveness is detected, determining that the target part of the target object triggers the pattern display operation.

14. The computer device according to claim 8, wherein the method further comprises:

transmitting the acquired key area image to a server, to enable the server to perform identity authentication on the key area image and perform resource transfer when the identity authentication passes; and when the identity authentication passes, receiving and displaying a resource transfer result fed back by the server.

15. A non-transitory computer-readable storage medium, having a computer program stored thereon that, when executed by a processor of a computer device, causes the computer device to perform an image acquisition method including:

displaying a mapping pattern corresponding to a key area of a target part of a target object in response to a pattern display operation triggered by the target object;

changing a display state of the currently displayed mapping pattern when a relative position of the target part relative to an image acquisition element changes, further including:

obtaining at least three effective distances corresponding to the key area of the target part by using at least three distance sensors when the target part is within an acquisition range of the image acquisition element, wherein the at least three distance sensors are evenly distributed around the image acquisition element;

constructing a virtual plane of the key area based on the at least three effective distances;

determining a relative posture of the key area based on a relative angle between the virtual plane and a standard plane; and adjusting the display state of the mapping pattern based on the relative posture; and acquiring a key area image of the target part contactlessly by using the image acquisition element when the currently displayed mapping pattern matches a preset recognition pattern.

16. The non-transitory computer-readable storage medium according to claim 15, wherein the changing a display state of the currently displayed mapping pattern when a relative position of the target part relative to an image acquisition element changes comprises:

changing a display size of the currently displayed mapping pattern in an opposite direction as a spatial height changes in an opposite direction, when the spatial height of the target part relative to the image acquisition element changes; and changing a display position of the currently displayed mapping pattern in a same direction as a plane position of the key area of the target part changes within an acquisition range of the image acquisition element.

17. The non-transitory computer-readable storage medium according to claim 15, wherein the method further comprises:

obtaining movement speed of the target part within the acquisition range of the image acquisition element;

performing integrity detection on the target part within the acquisition range of the image acquisition element, to obtain an integrity detection result; and performing the operation of acquiring a key area image of the target part by using the image acquisition element when it is determined, based on at least one of the movement speed or the integrity detection result, that the detected target part satisfies an acquisition condition.

18. The non-transitory computer-readable storage medium according to claim 15, wherein the method further comprises:

when the currently displayed mapping pattern does not match the preset recognition pattern, triggering to output second prompt information, the second prompt information being used for prompting the target object to adjust the relative position of the target part relative to the image acquisition element, to enable the displayed mapping pattern that changes as the relative position changes to match the preset recognition pattern.

19. The non-transitory computer-readable storage medium according to claim 15, wherein the method further comprises:

performing object detection and liveness detection on an object within the acquisition range of the image acquisition element; and when it is detected that the object is the target part of the target object and liveness is detected, determining that the target part of the target object triggers the pattern display operation.

20. The non-transitory computer-readable storage medium according to claim 15, wherein the method further comprises:

transmitting the acquired key area image to a server, to enable the server to perform identity authentication on the key area image and perform resource transfer when the identity authentication passes; and when the identity authentication passes, receiving and displaying a resource transfer result fed back by the server.

* * * * *